US009367499B2

(12) United States Patent
Yun et al.

(10) Patent No.: US 9,367,499 B2
(45) Date of Patent: Jun. 14, 2016

(54) SYSTEM ON CHIP FOR ENHANCING QUALITY OF SERVICE AND METHOD OF CONTROLLING THE SAME

(71) Applicant: SAMSUNG ELECTRONICS CO., LTD., Suwon-si, Gyeonggi-do (KR)

(72) Inventors: Jae-Geun Yun, Hwaseong-si (KR); Bub-Chul Jeong, Yongin-si (KR); Lingling Liao, Yongin-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 546 days.

(21) Appl. No.: 13/790,104

(22) Filed: Mar. 8, 2013

(65) Prior Publication Data

US 2013/0268706 A1    Oct. 10, 2013

(30) Foreign Application Priority Data

Apr. 4, 2012   (KR) .................. 10-2012-0034760

(51) Int. Cl.
  *G06F 13/36*   (2006.01)
  *G06F 13/364*  (2006.01)
  *G06F 13/40*   (2006.01)

(52) U.S. Cl.
  CPC .......... *G06F 13/364* (2013.01); *G06F 13/4022* (2013.01)

(58) Field of Classification Search
  CPC ....... G06F 13/14; G06F 13/18; G06F 13/362; G06F 13/1605; G06F 13/1663
  USPC ................................. 710/240–244
  See application file for complete search history.

(56) References Cited

U.S. PATENT DOCUMENTS

| 5,956,493 | A  | * | 9/1999  | Hewitt .................. G06F 13/364 710/113 |
| 6,160,812 | A  | * | 12/2000 | Bauman .............. H04L 12/5693 370/230 |
| 6,385,678 | B2 | * | 5/2002  | Jacobs .................. G06F 13/364 709/213 |
| 6,442,550 | B1 | * | 8/2002  | Rajamony .............. G06Q 30/02 707/999.01 |
| 6,785,793 | B2 |   | 8/2004  | Aboulenein et al. |
| 7,062,582 | B1 | * | 6/2006  | Chowdhuri ............. H04L 47/20 370/462 |
| 7,263,566 | B2 | * | 8/2007  | Ganasan ............... G06F 13/364 709/211 |
| 7,472,213 | B2 | * | 12/2008 | Fukuyama ............ G06F 13/161 710/241 |
| 7,483,488 | B1 | * | 1/2009  | Hsu ...................... H04N 19/159 375/240 |
| 8,266,389 | B2 | * | 9/2012  | Krishnan .............. G06F 13/161 710/243 |
| 8,452,907 | B2 | * | 5/2013  | Riocreux .............. G06F 13/362 710/200 |

(Continued)

FOREIGN PATENT DOCUMENTS

| JP | 2001-175588 | 6/2001 |
| JP | 2003-006146 | 1/2003 |
| JP | 2008-027245 | 2/2008 |

*Primary Examiner* — Brian Misiura
(74) *Attorney, Agent, or Firm* — F. Chau & Associates, LLC

(57) ABSTRACT

A system on chip (SOC) include at least one slave device, a plurality of master devices, a plurality of service controllers and an interconnect device. The master devices generate requests to demand services from the slave device, respectively. The service controllers generate urgent information signals and priority information signals for each of the master devices. The interconnect device is coupled to the slave device and the master devices through respective channels. The interconnect device performs an arbitrating operation on the requests based on the priority information signals and controls request flows between the slave device and the master devices based on the urgent information signals.

7 Claims, 24 Drawing Sheets

(56) References Cited

U.S. PATENT DOCUMENTS

| | | | | |
|---|---|---|---|---|
| 8,549,199 | B2* | 10/2013 | Mace | G06F 13/161 |
| | | | | 710/240 |
| 8,732,378 | B2* | 5/2014 | Nakazono | G06F 13/14 |
| | | | | 710/244 |
| 8,775,754 | B2* | 7/2014 | Campbell | G06F 13/1631 |
| | | | | 709/228 |
| 8,856,459 | B1* | 10/2014 | Biswas | G06F 13/18 |
| | | | | 710/244 |
| 8,930,601 | B2* | 1/2015 | Laughton | G06F 13/362 |
| | | | | 710/113 |
| 9,203,739 | B2* | 12/2015 | Beecroft | H04L 12/56 |
| 2003/0074507 | A1 | 4/2003 | Weber | |
| 2004/0172464 | A1 | 9/2004 | Nag | |
| 2005/0204085 | A1 | 9/2005 | Fukuyama et al. | |
| 2005/0240707 | A1 | 10/2005 | Hayashi et al. | |
| 2008/0209093 | A1* | 8/2008 | Huang | G06F 13/362 |
| | | | | 710/107 |
| 2008/0215783 | A1 | 9/2008 | Allen et al. | |
| 2008/0215832 | A1 | 9/2008 | Allen et al. | |
| 2011/0161713 | A1 | 6/2011 | Methar et al. | |
| 2014/0208071 | A1* | 7/2014 | Jeong | G06F 15/7807 |
| | | | | 712/31 |

\* cited by examiner

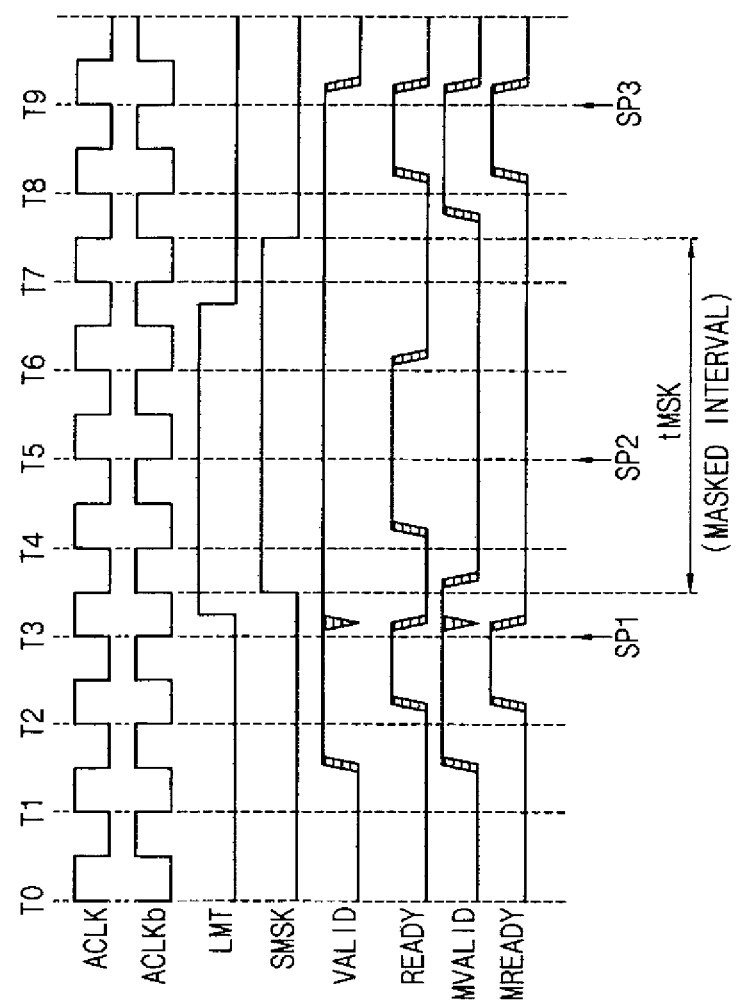

| | CONDITION | IP TYPE |
|---|---|---|
| CASE1 | ISSUE FULL (OSCNT=MXN) | HARD REALTIME |
| CASE2 | ISSUE FULL<br>OR<br>VERY URGENT & OSCNT ≧ SVUN<br>(MXN > SVUN) | SOFT REALTIME |
| CASE3 | ISSUE FULL<br>OR<br>VERY URGENT & OSCNT ≧ BVUN<br>OR<br>URGENT & OSCNT ≧ BUN<br>(MXN > BUN > BVUN) | BEST EFFORT |

210

240

250

1000a

240a

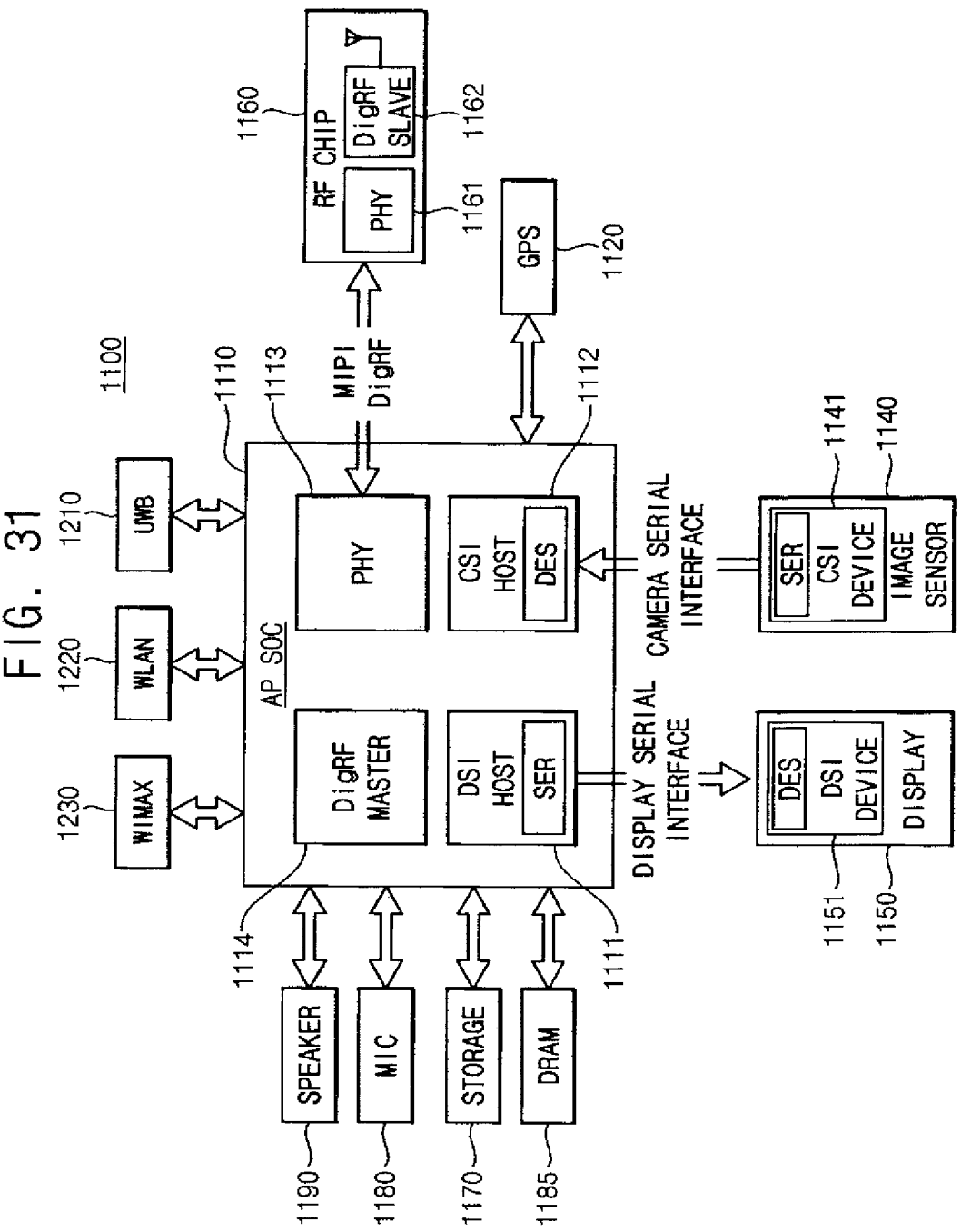

SYSTEM ON CHIP FOR ENHANCING QUALITY OF SERVICE AND METHOD OF CONTROLLING THE SAME

CROSS-REFERENCE TO RELATED APPLICATION

This application claims priority under 35 USC §119 to Korean Patent Application No. 10-2012-0034760, filed on Apr. 4, 2012, in the Korean Intellectual Property Office (KIPO), the disclosure of which is incorporated by reference in its entirety herein.

BACKGROUND

1. Technical Field

Exemplary embodiments of the inventive concept relate generally to semiconductor integrated circuits and more particularly to a system on chip (SOC) and a method of controlling the SOC for enhancing quality of service (QOS).

2. Discussion of Related Art

An SOC indicates a chip or a system on the chip in which various semiconductor components are integrated as one chip. The recent market trend is away from application specific integrated circuits (ASICs) and application specific standard products (ASSPs), toward SOC technologies. Further, there is an increasing demand for reducing the size and increasing the performance level of the SOC. While the integration degree of the SOC may be increased by integrating additional components into one chip, san operational speed of the SOC may not increase sufficiently.

SUMMARY

At least one exemplary embodiment of the inventive concept provides an interconnect device and a system on chip (SOC) including the interconnect device, capable of efficiently controlling request flows according to traffic conditions and/or operational characteristics of intellectual properties.

At least one exemplary embodiment of the inventive concept provides a method of controlling an SOC, capable of efficiently controlling request flows according to traffic conditions and/or operational characteristics of intellectual properties.

At least one exemplary embodiment of the inventive concept provides an SOC including a multi-layer interconnect device, capable of efficiently controlling request flows according to traffic conditions and/or operational characteristics of intellectual properties.

According to an exemplary embodiment of the inventive concept, a system on chip (SOC) include at least one slave device, a plurality of master devices, a plurality of service controllers and an interconnect device. The master devices generate requests to demand services from the slave device, respectively. The service controllers generate urgent information signals and priority information signals, respectively. The interconnect device is coupled to the slave device and the master devices through respective channels. The interconnect device performs an arbitrating operation on the requests based on the priority information signals and controls request flows between the slave device and the master devices based on the urgent information signals.

The interconnect device may include a limit signal generator configured to generate a limit signal based on at least one of the urgent information signals. At least one of the service controllers may include a limiter configured to block the request flow between the corresponding master device and the interconnect device based on the limit signal.

The limit signal generator may generate the limit signal based on the urgent information signals that are generated by the service controllers except the service controller receiving the limit signal.

The limiter may include a synchronizer configured to generate a synchronized limit signal based on the limit signal from the interconnect device, and a mask unit configured to block the request flow between the corresponding master device and the interconnect device based on the synchronized limit signal.

The synchronizer may sample the limit signal in response to falling edges of a global clock signal of the interconnect device to generate the synchronized limit signal.

The mask unit may include a first logic gate configured to output a masked valid signal by performing a logic operation on the synchronized limit signal and a valid signal from the corresponding master device, and a second logic gate configured to output a masked ready signal by performing a logic operation on the synchronized limit signal and a ready signal from the interconnect device.

Each of the service controllers may include a monitor configured to generate a current request level by detecting the service requirement level of the corresponding master device in realtime, and an information generator configured to generate the urgent information signal and the priority information signal based on a reference value and the current request level.

The monitor may include at least one of a bandwidth monitor configured to generate a current bandwidth level by detecting a bandwidth of the corresponding master device in realtime, and a latency monitor configured to generate a current latency level by detecting a latency of the corresponding master device in realtime.

The bandwidth monitor may include a consumed data detector configured to generate a level decrease signal based on an operational clock signal of the corresponding master device and a unit amount of consumed data, a serviced data detector configured to generate a level increase signal based on channel signals transferred between the corresponding master device and the interconnect device, and a virtual buffer configured to generate the current bandwidth level based on the level decrease signal and the level increase signal.

The latency monitor may include a latency detector configured to generate a current latency based on channel signals between the corresponding master device and the interconnect device, a subtractor configured to calculate a difference between a reference latency and the current latency to generate a latency difference value, and an accumulator configured to accumulate the latency difference value to generate the current latency level.

The latency detector may generate the current latency based on a service request signal and a service done signal among the channel signals, where the service request signal is provided from the corresponding master device and the request done signal is provided from the interconnect device.

The interconnect device may include an arbitration circuit configured to output a selected request among the requests from the master devices based on the priority information signals, a block control signal generator configured to generate block control signals based on the urgent information signals, and a block circuit configured to block the requests from being input to the arbitration circuit in response to the block control signals.

The block control signal generator may activate each of the block control signals when each of conditions different from each other is satisfied where the conditions depend on operational characteristics of the respective master devices.

The block circuit may block valid signals input to the arbitration circuit in response to the block control signals.

The interconnect device may be a multi-layer interconnect device including a first bus and at least one second bus, where the first bus is directly coupled to the master devices and the second bus is cascade-coupled between the first bus and the slave device. The urgent information signals and the priority signals from the master devices may be transferred through the first bus to the second bus so that the transferred urgent information signals and the transferred priority signals are provided to perform an arbitrating operation in the second bus and a control operation of the request flow between the second bus and the slave device.

The first bus may generate a combination urgent information signal based on the urgent information signals from the master devices that are coupled to the first bus. The second bus may control, based on the combination urgent information signal, the request flow between the slave device and the master device that is coupled to the second bus without passing through the first bus.

Each of the first bus and the second bus may include a request queue configured to store multiple outstanding requests.

According to an exemplary embodiment of the inventive concept, a method of controlling a system on chip (SOC) including at least one slave device, a plurality of master devices and an interconnect device, the slave device and the master devices coupled to the interconnect device through respective channels, the master devices generating requests to demand services from the slave device, respectively, at least one of bandwidths and latencies of the master devices is detected based on operational characteristics of the master devices. Urgent information signals and priority information signals are generated based on at least one of the bandwidths and the latencies. An arbitrating operation on the requests is performed based on the priority information signals. Request flows between the slave device and the master devices are controlled based on the urgent information signals.

Controlling the request flows between the slave device and the master devices may include generating a limit signal based on at least one of the urgent information signals, and blocking the request flow between the corresponding master device and the interconnect device based on the limit signal.

Controlling the request flows between the slave device and the master devices may include generating block control signals based on the urgent information signals, and blocking the requests from being input to an arbitration circuit in response to the block control signals, the arbitration circuit included in a first bus to which the master devices are directly coupled.

Each of the block control signals may be activated when each of conditions different from each other is satisfied, the conditions depending on operational characteristics of the respective master devices.

Controlling the request flows between the slave device and the master devices further may include generating a combination urgent information signal based on the urgent information signals from the master devices that are coupled to the first bus, transferring the combination urgent information signal to at least one second bus that is cascade-coupled between the first bus and the slave device, and controlling, based on the combination urgent information signal, the request flow between the slave device and the master device that is coupled to the second bus without passing through the first bus.

Detecting at least one of the bandwidths and the latencies of the master devices may include at least one of calculating a data occupancy rate of a data buffer included in the corresponding master device, and accumulating a difference between a reference latency and a current latency of the corresponding master device.

The requests may be transferred according to a handshake scheme that uses a valid signal and a ready signal, and controlling the request flows between the slave device and the master devices may include deactivating at least one of the valid signal and the ready signal based on the urgent information signals.

According to an exemplary embodiment of the inventive concept, an interconnect device of a system on chip (SOC) includes an arbitration circuit configured to output a selected request among requests from master devices based on priority information signals indicating service requirement levels of the respective master devices, a block control signal generator configured to generate block control signals based on urgent information signals indicating service requirement levels of the respective master devices, and a block circuit configured to block the requests from being input to the arbitration circuit in response to the block control signals.

According to an exemplary embodiment of the inventive concept, a system on chip (SOC) includes at least one slave device, a plurality of master devices configured to generate requests to demand services from the slave device, respectively, a plurality of service controllers configured to generate urgent information signals and priority information signals, respectively, the urgent information signals and priority information signals indicating service requirement levels of the respective master devices, and a multi-layer interconnect device coupled to the slave device and the master devices through respective channels. The multi-layer interconnect device includes a first bus and at least one second bus. The first bus directly is coupled to the master devices, the second bus is cascade-coupled between the first bus and the slave device. The multi-layer interconnect device is configured to perform an arbitrating operation on the requests based on the priority information signals and is configured to control request flows between the slave device and the master devices based on the urgent information signals.

According to an exemplary embodiment of the inventive concept, a system on chip (SOC) includes at least one slave device, a plurality of master devices, a plurality of service controllers, and an interconnect device. The master devices demand services from the at least one slave device. The service controllers are configured to generate a priority level for each master device that is based on a measured level measured from the corresponding master device, and an urgency level based on how the level compares to an urgency threshold level. The interconnect device interfaces the at least one slave device with the master devices, processes the requests in an order based on the priority levels, and ignores some of the requests based on the urgency levels.

In an embodiment, the measured level is a bandwidth of the corresponding master device that is measured using a virtual buffer. The virtual buffer may measure the bandwidth based on an amount of data consumed by the corresponding master device during a given period and a number of signals transferred between the master device and the interconnect device.

In an embodiment the measured level is a latency of the corresponding master device that is measured using an accumulator. The accumulator may measure the latency based on a latency difference generated by subtracting a current latency from a reference latency. The current latency may be based on a number of signals transferred between the master device and the interconnect device.

BRIEF DESCRIPTION OF THE DRAWINGS

Exemplary embodiments of the inventive concept will be more clearly understood from the following detailed description taken in conjunction with the accompanying drawings.

FIG. 13B is a timing diagram illustrating an exemplary operation of the limiter of FIG. 13A.

FIG. 31 is a block diagram illustrating an interface employable in the computing system of FIG. 30 according to an exemplary embodiment of the inventive concept.

DETAILED DESCRIPTION

Figure 1:
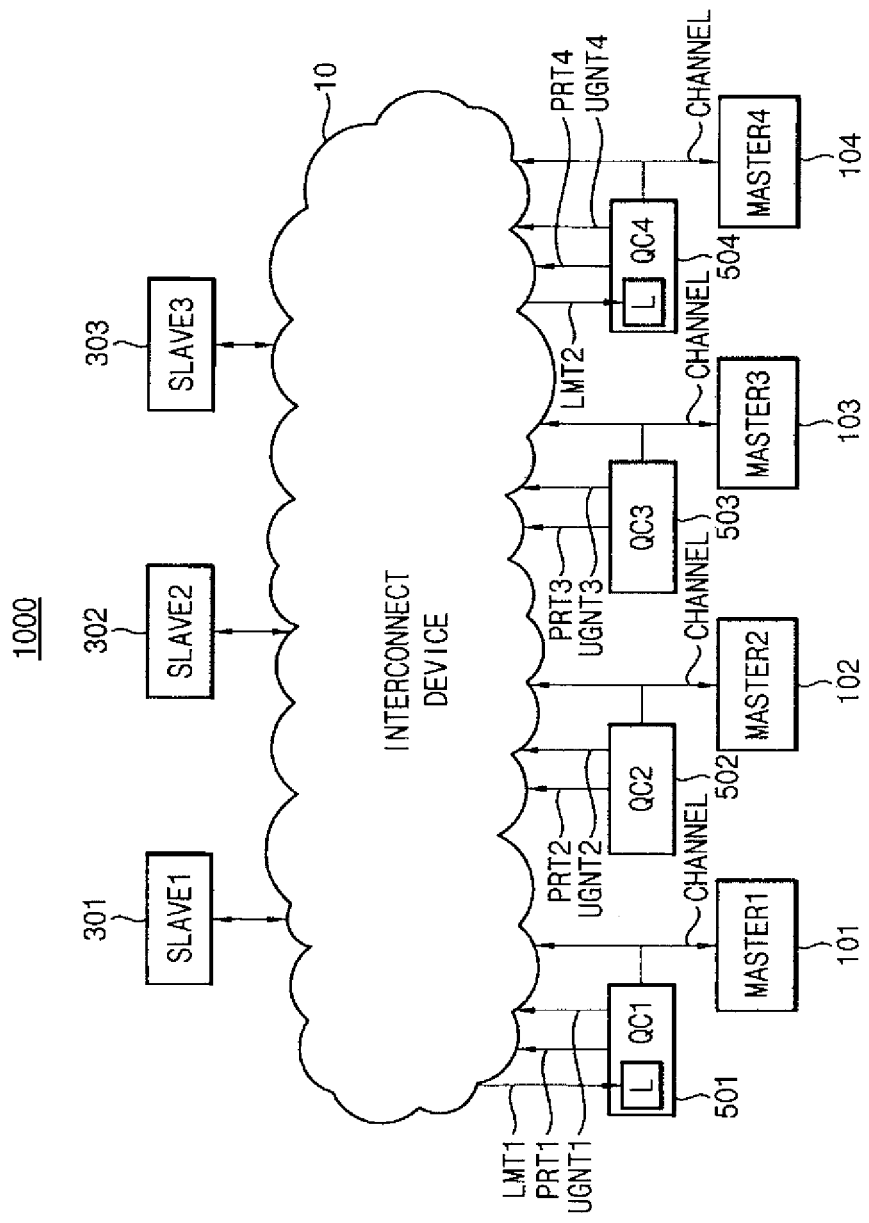
FIG. 1 is a block diagram illustrating a system according to an exemplary embodiment of the inventive concept.

The inventive concept will be described more fully hereinafter with reference to the accompanying drawings, in which some exemplary embodiments of the inventive concept are shown. The present inventive concept may, however, be embodied in many different forms and should not be construed as limited to the exemplary embodiments set forth herein. In the drawings, the sizes and relative sizes of layers and regions may be exaggerated for clarity. Like numerals refer to like elements throughout.

It will be understood that when an element is referred to as being "connected" or "coupled" to another element, it can be directly connected or coupled to the other element or intervening elements may be present. As used herein, the singular forms "a," "an" and "the" are intended to include the plural forms as well, unless the context clearly indicates otherwise.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram illustrating a system according to an exemplary embodiment of the inventive concept. The system may be a system on chip (SOC) in which various semiconductor components are integrated as one chip.

Referring to FIG. 1, a system 1000 includes master devices (MASTERi, i=1, 2, 3, 4) 101, 102, 103 and 104, slave devices (SLAVEj, j=1, 2, 3) 301, 302 and 303, service controllers (QCi) 501, 502, 503 and 504 and an interconnect device 10. The master devices 101, 102, 103 and 104 and the slave devices 301, 302 and 303 may be referred to as an intellectual property (IP), respectively. In an exemplary embodiment, the master devices 101-104 and/or slave devices are reusable units of logic, cells, or a portion of a chip that contains the IP of one or more parties. The master devices and/or slave devices may also be referred to as IP cores or IP blocks. While FIG. 1 shows three slaves, four service controllers, and four masters, this is merely one example, as the inventive concept is not limited to any particular number of slaves, service controllers, or masters.

The master devices 101, 102, 103 and 104 may generate requests to demand services from at least one of the slave devices 301, 302 and 303, respectively. The service controllers 501, 502, 503 and 504 generate urgent information signals UGNTi, and priority information signals PRTi, respectively. The service controllers may generate the urgent information signals UGNTi and priority information signals PRTi in realtime. The urgent information signals UGNTi and the priority information signals PRTi indicate service requirement levels of the respective master devices 101, 102, 103 and 104. The slave devices 301, 302 and 303 and the master devices 101, 102, 103 and 104 are coupled to the interconnect device 10 through respective channels. The interconnect device 10 performs an arbitrating operation on the requests based on the priority information signals PRTi and controls request flows between the slave device 301, 302 and 303 and the master devices 101, 102, 103 and 104 based on the urgent information signals UGNTi. For example, if requests from two difference master devices for the same slave device have a same priority, the more urgent request may be processed first. For example, the less urgent request could be blocked from being processed.

At least one of the service controllers 501, 502, 503 and 504 may include a limiter L. FIG. 1 illustrates an example where the first service controller 501 and the fourth service controller 504 include the limiter L. The limiters L block the request flows between the corresponding master devices 101 and 104 and the interconnect device 10 based on limit signals LMT1 and LMT2, respectively.

The interconnect device 10 may generate the limit signals LMT1 and LMT2 based on at least one of the urgent information signals UGNTi.

The numbers of the master devices and the slave devices in FIG. 1 may be changed variously. The configurations of the service controllers 501, 502, 503 and 504 may be the same or different from each other depending on the operational characteristics of the respective master devices 101, 102, 103 and 104. Some of the service controllers 501, 502, 503 and 504 may be omitted.

Figure 2:
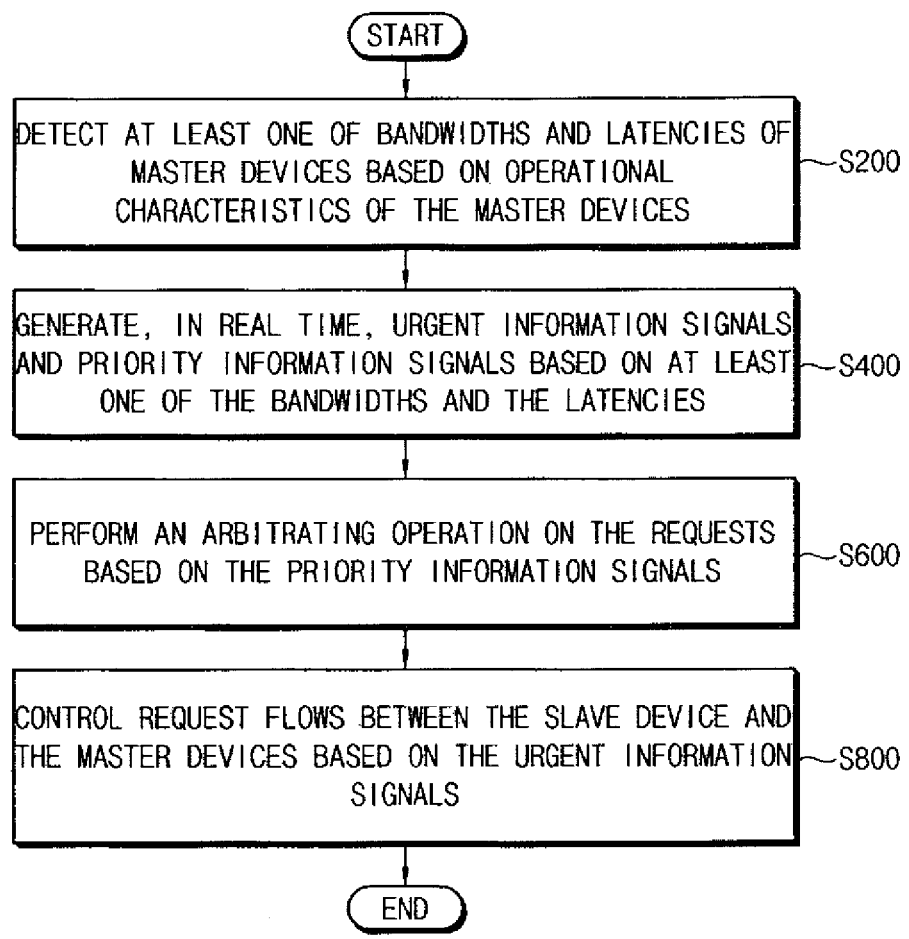
FIG. 2 is a flow chart illustrating a method of controlling a system according to an exemplary embodiment of the inventive concept.

FIG. 2 is a flow chart illustrating a method of controlling a system according to an exemplary embodiment of the inventive concept.

FIG. 2 illustrates a method of controlling a system that includes at least one slave device, a plurality of master devices and an interconnect device such that the slave device and the master devices are coupled to the interconnect device through respective channels and the master devices generate requests to demand services from the slave device, respectively, as illustrated in FIG. 1.

Referring to FIGS. 1 and 2, at least one of bandwidths and latencies of the master devices is detected based on operational characteristics of the master devices (S200). In an exemplary embodiment, the bandwidth indicates an amount of data transferred by the corresponding master device within a prescribed period of time. In an exemplary embodiment, the latency is a measure of the time delay experienced in transferring data through the corresponding master device. Urgent information signals and priority information signals are generated in realtime based on at least one of the bandwidths and the latencies (S400). The term 'realtime' may be used to mean 'without perceivable delay'. An arbitrating operation is performed on the requests based on the priority information signals (S600). Request flows between the slave device and the master devices are controlled based on the urgent information signals (S800).

Hereinafter, various exemplary embodiments of the system of FIG. 1 and the method of FIG. 2 are described with reference to FIGS. 3 through 29.

Figure 3:
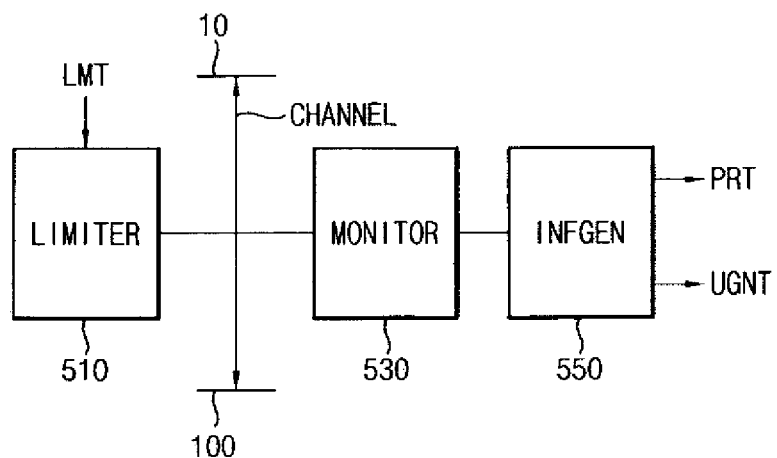
FIG. 3 is a block diagram illustrating a service controller according to an exemplary embodiment of the inventive concept.

FIG. 3 is a block diagram illustrating a service controller according to an exemplary embodiment of the inventive concept.

Referring to FIG. 3, a service controller 500 includes a limiter 510, a monitor 530 and an information generator (INFGEN) 550. The service controller 500 may be coupled to a channel between an interconnect device 10 and a master device 100.

The limiter 510 may receive a limit signal LMT from the interconnect device 10 to block the request flow between the corresponding master device 100 and the interconnect device 10 based on the limit signal LMT. In an exemplary embodiment, the request flow is a computer message from the master device requesting a service from a slave device. The master device 100 may be one of the master devices 101, 102, 103 and 104 in FIG. 1. Some master devices may not include the limiter 510 depending on operational characteristics. For example, the first and fourth master devices 101 and 104 may include the limiter L and the second and third master devices 102 and 103 exclude include the limiter as illustrated in FIG. 1.

The monitor 530 may generate a current request level by detecting the service requirement level of the corresponding master device 100 (e.g., in realtime). As will be described with reference to FIGS. 4 through 10, the monitor 530 may be a bandwidth monitor, a latency monitor, or a combination thereof.

The information generator 550 may generate an urgent information signal UGNT and a priority information signal PRT based on a reference value and the current request level.

Figure 4:
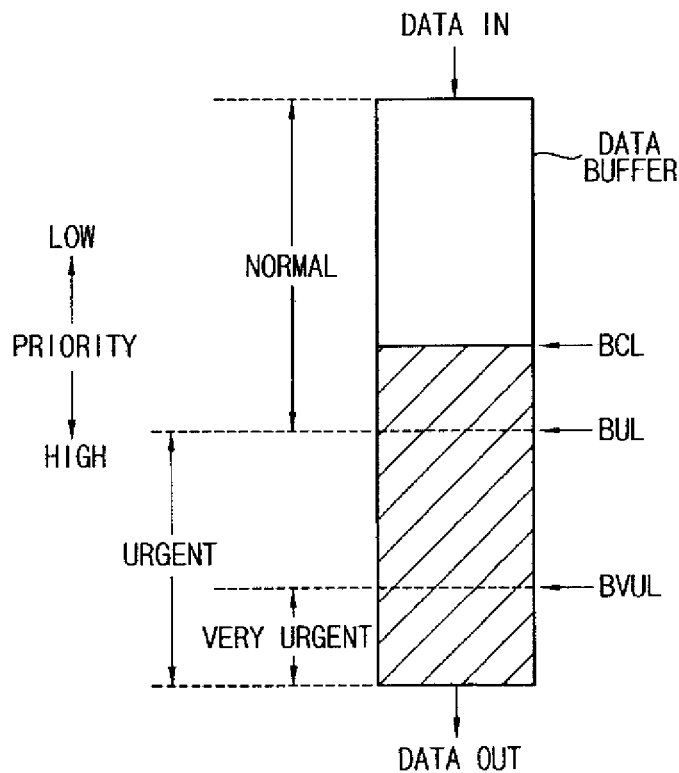
FIG. 4 is a diagram illustrating a buffer model for detecting a bandwidth according to an exemplary embodiment of the inventive concept.

FIG. 4 is a diagram illustrating a buffer model for detecting a bandwidth according to an exemplary embodiment of the inventive concept.

Depending on the operational characteristic of the master device, the service requirement level may be represented as a bandwidth. The bandwidth is a data amount that is served or transferred during a unit time. For example, data may be served to the master device from the slave device such as a memory controller that is coupled to the master device through the interconnect device. The master device may store the served data in a data buffer to perform its own function on the stored data. Performing of the function on the stored data and outputting the result may be referred to as consuming the data.

A data occupancy state of the data buffer in the master device is illustrated using oblique lines in FIG. 4 and the data occupancy state may be represented as a current bandwidth level BCL. The current bandwidth level BCL is increased when data is served (DATA IN) from the slave device and the current bandwidth level BCL is decreased when the stored data is consumed (DATA OUT) by the master device. The higher priority may be assigned as the current bandwidth level BCL is decreased and the lower priority may be assigned as the current bandwidth level BCL is increased.

According to an exemplary embodiment of the system 1000, reference values such as a bandwidth urgent level BUL and a bandwidth very urgent level BVUL may be determined. The above-mentioned urgent information signal UGNT may be generated based on the reference values BUL and BVUL and the current bandwidth level BCL. The master device may be considered as operating in a normal state when the current bandwidth level BCL is higher than the bandwidth urgent level BUL and then the urgent information signal UGNT may be deactivated.

The urgent information signal UGNT may include a plurality of bits or a plurality of signals to represent whether or how the current bandwidth level BCL corresponds to an urgent situation. For example, the service controller 500 may generate an urgent flag signal UG that is activated when the current bandwidth level BCL is lower than the bandwidth urgent level BUL and a very urgent flag signal VUG that is activated when the current bandwidth level BCL is lower than the bandwidth very urgent level BVUL as will be described below.

Figure 5:
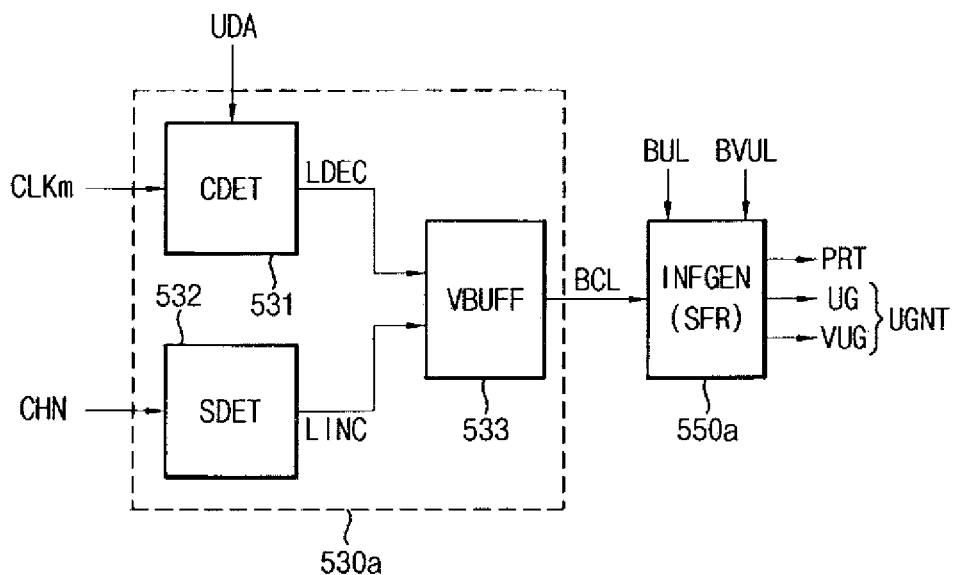
FIG. 5 is a block diagram illustrating an exemplary service controller using the buffer model of FIG. 4.

FIG. 5 is a block diagram illustrating an exemplary service controller using the buffer model of FIG. 4.

Referring to FIG. 5, a service controller 500a includes a bandwidth monitor 530a and an information generator 550a.

The bandwidth monitor 530a may generate a current bandwidth level BCL by detecting a bandwidth of the corresponding master device 100 (e.g., in realtime). The bandwidth monitor 530a may include a consumed data detector (CDET) 531, a serviced data detector (SDET) 532 and a virtual buffer (VBUFF) 533.

For example, the consumed data detector 531 may generate a level decrease signal LDEC based on an operational clock signal CLKm of the corresponding master device 100 and a unit amount UDA of consumed data. For example, the level decrease signal LDEC may indicate how much data has been consumed by the master device 100 during a given period of time. The serviced data detector 532 may generate a level increase signal LINC based on channel signals CHN transferred between the corresponding master device 100 and the interconnect device 10. For example, the level increase signal LINC may indicate the number of signals exchanged between interconnect device 10 and the master device 100 during a given period of time. The virtual buffer 533 may generate the current bandwidth level BCL based on the level decrease signal LDEC and the level increase signal LINC.

The information generator 550a may generate the urgent information signal UGNT and the priority information signal PRT based on at least one of the reference values BUL and BVUL and the current bandwidth level BCL. The information generator 550a may generate the priority information signal PRT such that the priority information signal PRT represents the higher priority as the current bandwidth level BCL decreases and the lower priority as the current bandwidth level BCL increases.

As mentioned above, the reference values such as the bandwidth urgent level BUL and the bandwidth very urgent level BVUL may be determined depending on the embodiment of the system 1000. For example, the reference values BUL and BVUL may be provided to and stored in the information generator 550a during an initializing stage of the system 1000. The information generator 550a may generate the urgent information signal UGNT based on the stored reference values BUL and BVUL.

For example, the information generator 550a may generate an urgent flag signal UG that is activated when the current bandwidth level BCL becomes lower than the bandwidth urgent level BUL and a very urgent flag signal VUG that is activated when the current bandwidth level BCL becomes lower than the bandwidth very urgent level BVUL. The information generator 550a may be implemented as a special function register (SFR) that performs predetermined process sequences in response to stored values and input signals.

Figure 6:
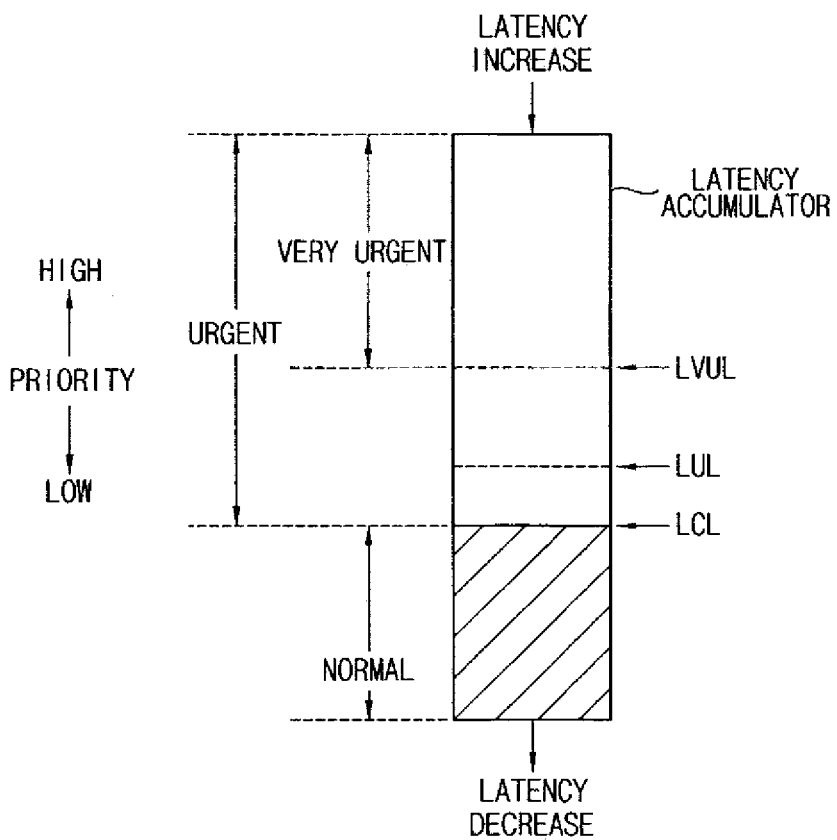
FIG. 6 is a diagram illustrating an accumulator model for detecting a latency according to an exemplary embodiment of the inventive concept.

FIG. 6 is a diagram illustrating an accumulator model for detecting a latency according to an exemplary embodiment of the inventive concept.

Depending on the operational characteristic of the master device, the service requirement level may be represented as a latency. The latency may be a delay from when the master device issues the request for service to when the requested service has completed. For example, the latency may be represented as a cycle number of a clock signal.

A latency state of an accumulator in the master device is illustrated using oblique lines in FIG. 6 and the latency state may be represented as a current latency level LCL. The current latency level LCL is increased when the latency of the accumulator is increased and the current latency level LCL is decreased when the latency of the accumulator is decreased. The higher priority may be assigned as the current latency level LCL is increased and the lower priority may be assigned as the current latency level LCL is decreased.

According to an exemplary embodiment of the system 1000, reference values such as a latency urgent level LUL and a latency very urgent level LVUL may be determined. The above-mentioned urgent information signal UGNT may be generated based on the reference values LUL and LVUL and the current latency level LCL. The master device may be considered as operating in a normal state when the current latency level LCL is lower than the latency urgent level LUL and then the urgent information signal UGNT may be deactivated.

The urgent information signal UGNT may include a plurality of bits or a plurality of signals to represent whether or how the current latency level LCL corresponds to an urgent situation. For example, the service controller 500 may generate an urgent flag signal UG that is activated when the current latency level LCL is higher than the latency urgent level LUL and a very urgent flag signal VUG that is activated when the current latency level LCL is higher than the latency very urgent level LVUL as will be described below.

Figure 7:
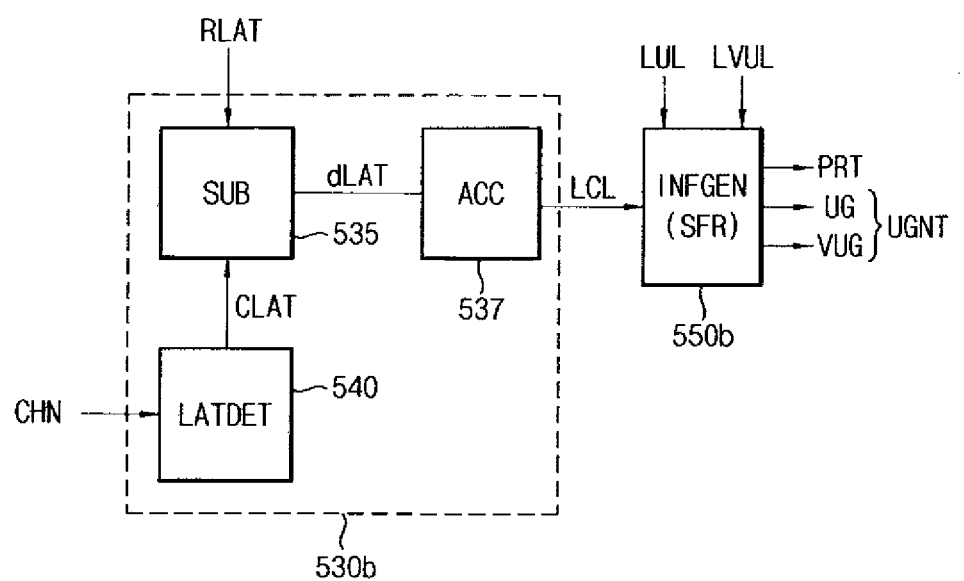
FIG. 7 is a block diagram illustrating an exemplary service controller using the accumulator model of FIG. 6.

FIG. 7 is a block diagram illustrating an exemplary service controller using the accumulator model of FIG. 6.

Referring to FIG. 7, a service controller 500b includes a latency monitor 530b and an information generator 550b.

The latency monitor 530b may generate a current latency level LCL by detecting a latency of the corresponding master device 100 (e.g., in realtime). The latency monitor 530b may include a latency detector (LATDET) 540, a subtractor (SUB) 535 and an accumulator (ACC) 537.

The latency detector 540 may generate a current latency CLAT based on channel signals CHN transmitted between the corresponding master device 100 and the interconnect device 10. For example, the latency detector 540 may generate the current latency CLAT based on the number of signals transmitted between the master device 100 and the interconnect device 10 during a given period. The subtractor 535 may calculate a difference between a reference latency RLAT and the current latency CLAT to generate a latency difference value dLAT. The accumulator 537 may accumulate the latency difference value dLAT to generate the current latency level LCL.

The information generator 550b may generate the urgent information signal UGNT and the priority information signal PRT based on at least one of the reference values LUL and LVUL and the current latency level LCL. The information generator 550b may generate the priority information signal PRT such that the priority information signal PRT represents the higher priority as the current latency level LCL increases and the lower priority as the current latency level LCL decreases.

As mentioned above, the reference values such as the latency urgent level LUL and the latency very urgent level LVUL may be determined depending on the embodiment of the system 1000. For example, the reference values LUL and LVUL may be provided to and stored in the information generator 550b during an initializing stage of the system 1000. The information generator 550b may generate the urgent information signal UGNT based on the stored reference values LUL and LVUL.

For example, the information generator 550b may generate an urgent flag signal UG that is activated when the current latency level LCL becomes higher than the latency urgent level LUL and a very urgent flag signal VUG that is activated when the current latency level LCL becomes higher than the latency very urgent level LVUL. The information generator 550b may be implemented as a special function register (SFR) that performs predetermined process sequences in response to stored values and input signals.

Figure 8:
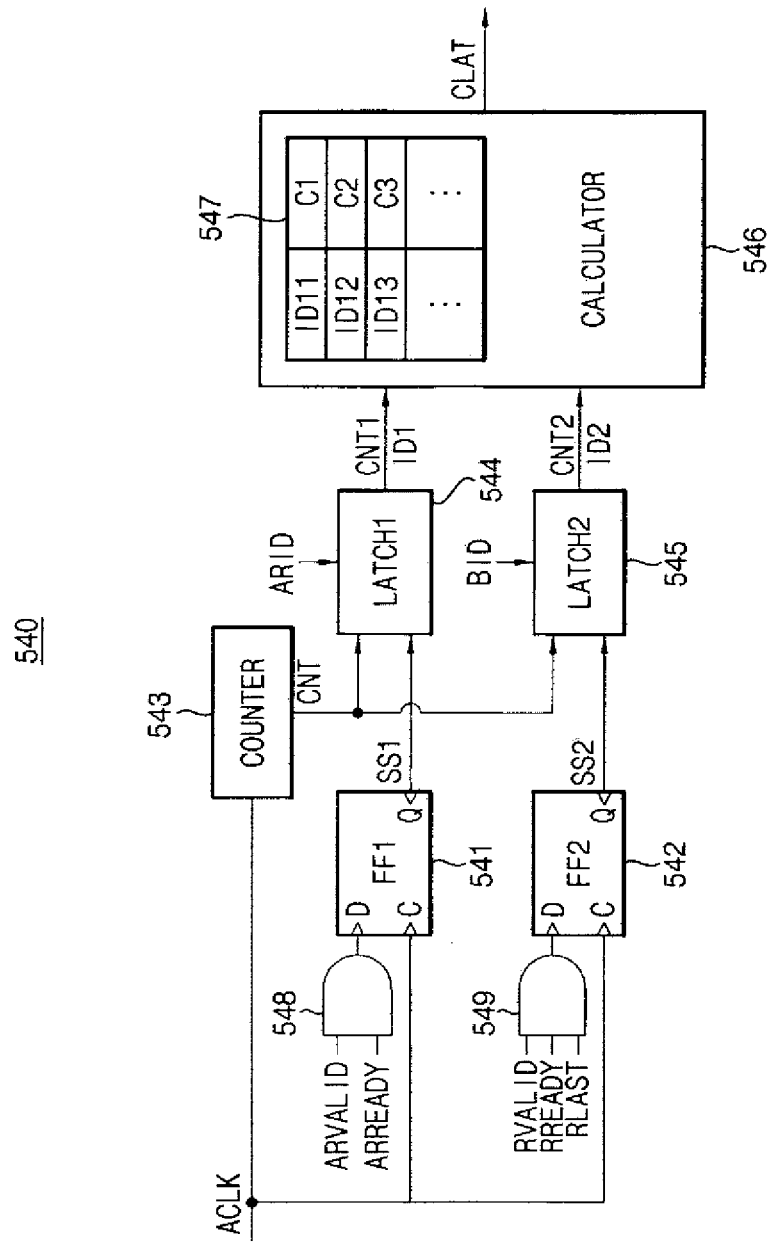
FIG. 8 is a block diagram illustrating an exemplary latency detector included in the service controller of FIG. 7.

FIG. 8 is a block diagram illustrating an exemplary latency detector included in the service controller of FIG. 7.

Referring to FIG. 8, a latency detector 540 includes a first flip-flop (FF1) 541, a second flip-flop (FF2) 542, a counter 543, a first latch (LATCH1) 544, a second latch (LATCH2) 545, a calculator 546, a first logic gate 548 and a second logic gate 549.

For example, the first logic gate 548 may be implemented as an AND gate that performs an AND operation on a request valid signal ARVALID and a request ready signal ARREADY to output an operation result. The output of the first gate 548 is input to a data terminal D of the first flip-flop 541 and a global clock signal ACLK is input to a clock terminal C of the first flip-flop 541. The first flip-flop 541 samples the output of the first gate 548 in response to the global clock signal ACLK to output a first sampling signal SS1 though an output terminal Q. For example, the first flip-flop 541 may sample the output of the first gate 548 in response to a rising edge of the global clock signal ACLK.

For example, the second logic gate 549 may be implemented as an AND gate that performs an AND operation on a service valid signal RVALID, a service ready signal RREADY and a service done signal RLAST to output an operation result. The output of the second gate 549 is input to a data terminal D of the second flip-flop 542 and the global clock signal ACLK is input to a clock terminal C of the second flip-flop 542. The second flip-flop 541 samples the output of the second gate 549 in response to the global clock signal ACLK to output a second sampling signal SS2 though an output terminal Q. For example, the second flip-flop 541 may sample the output of the second gate 549 in response to a rising edge of the global clock signal ACLK.

The request valid signal ARVALID, the request ready signal ARREADY, the service valid signal RVALID, the service ready signal RREADY and the service done signal RLAST may be included in the channel signals CHN in FIG. 7.

The counter 543 counts a cycle number of the global clock signal ACLK to provide a count signal CNT.

The first latch 544 latches the count signal CNT in response to first sampling signal SS1 to provide a start count signal CNT1. For example, the first latch 544 may latch the count signal CNT in response to a rising edge of the first sampling signal SS1. The first latch 544 may receive a first identification signal ARID associated with the request signals ARVALID and ARREADY to provide a first identification code ID1.

The second latch 545 latches the count signal CNT in response to the second sampling signal SS2 to provide an end count signal CNT2. For example, the second latch 545 may latch the count signal CNT in response to a rising edge of the second sampling signal SS2. The second latch 545 may receive a second identification signal BID associated with the service signals RVALID, RREADY and RLAST to provide a second identification code ID2.

The calculator 546 generates a current latency CLAT based on the start count signal CNT1 and the end count signal CNT2. When the system 1000 adopts a protocol supporting multiple outstanding transactions between the master devices, the interconnect device and the slave devices, the identification signals ARID and BID may be used to determine whether the request signals ARVALID and ARREADY are associated with the same transaction as the service signals RVALID, RREADY and RLAST.

Whenever the start count signal CNT1 and the first identification code ID1 are input, the calculator 546 may upgrade a mapping table 547 to store values ID11, ID12 and ID13 of the first identification code ID1 and corresponding count values C1, C2 and C3 of the start count signal CNT1. When the end count signal CNT2 and the second identification code ID2 are input, the calculator 546 extracts one of the count values C1, C2 and C3 from the mapping table 547 by comparing the value of the second identification signal ID2 and the previously stored values ID11, ID12 and ID13 of the first identification signal ID1.

The extracted value represents a service request timing point and the value of the end count signal CNT2 represents a request done timing point. For example, the service request timing point may correspond to the time at which the service was requested and the request done timing point may correspond to the time at which the request service completed. The calculator 546 may generate the current latency CLAT by calculating the difference between the extracted value representing the service request timing point and the value representing the issue done timing point.

Figure 9:
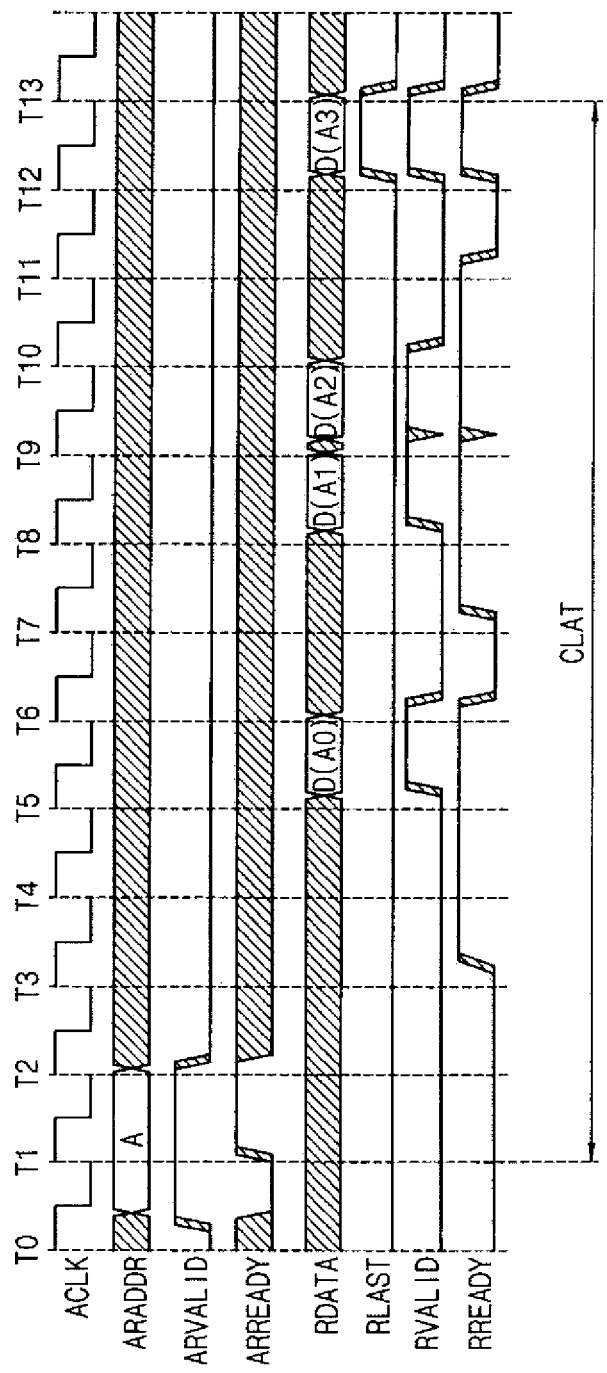
FIG. 9 is a timing diagram illustrating an exemplary transaction performed by a system and an exemplary current latency detected by the latency detector of FIG. 8.

FIG. 9 is a timing diagram illustrating an exemplary transaction performed by a system and a current latency detected by the latency detector of FIG. 8.

FIG. 9 illustrates an example of a read transaction according to an advanced extensible interface (AXI) protocol. The AXI protocol adopts a handshake scheme using valid signals and ready signals.

According to the handshake scheme, if a first one of a master interface and a slave interface transfers a signal to a second one of the master interface and the slave interface, the first one activates a valid signal, and then the second one activates a ready signal corresponding to the valid signal when the second one is ready to receive the signal. Sampling of signals is performed in response to a global clock signal ACLK at both of the master interface and the slave interface. For example, the sampling of signals may be performed in response to rising edges of the global clock signal ACLK. In an exemplary embodiment, a valid signal transfer is fulfilled when both of the valid signal and the ready signal are activated at the same rising edge of the global clock signal ACLK.

As illustrated in FIG. 9, the master device 100 corresponding to the master interface activates a request valid signal ARVALID when the master device transfers a signal and the interconnect device 10 corresponding to the slave interface activates a request ready signal ARREADY when the interconnect device 10 is ready to receive the signal from the master device 100. In the same way, the interconnect device 10 activates a service valid signal RVALID when the interconnect device 10 transfers a signal and the master device 100 activates a service ready signal RREADY when the master device is ready to receive the signal from the interconnect device 10.

The rising edges of the global clock signal ACLK are represented as timing points T0 through T13 in FIG. 9. The master interface 100 corresponding to the master interface transfers a read request signal ARADDR to the interconnect device 10 corresponding to the slave interface by activating the request valid signal ARVALID corresponding to a service request signal. The read request signal ARADDR is transferred successfully at the timing point T2 when both of the request valid signal ARVALID and the request ready signal ARREADY are activated. The master device 100 may determine the timing point T1 as a service request timing point based on the request valid signal ARVALID regardless of the request ready signal, that is, regardless of the success of the valid signal transfer.

As a response to the read request, data D(A0), D(A1), D(A2) and D(A3) of a burst type are transferred from the interconnect device 10 to the master device 100. The data D(A0), D(A1), D(A2) and D(A3) are transferred successfully at timing points T6, T9, T10 and T13, respectively, when both of the service valid signal RVALID and the service ready signal RREADY are activated. The interconnect device 10 activates a service done signal RLAST with transferring the last data D(A3), and the timing point T13 is determined as a service done timing point.

As such, the latency detector 540 of FIG. 8 may detect the current latency CLAT based on the request signals ARVALID and ARREADY and the service signals RVALID, RREADY and RLAST among the channel signals CHN between the master device 100 and the interconnect device 10.

Figure 10:
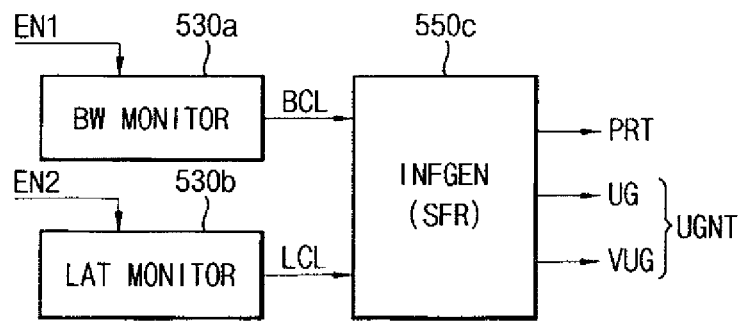
FIG. 10 is a block diagram illustrating a service controller according to an exemplary embodiment of the inventive concept.

FIG. 10 is a block diagram illustrating a service controller according to an exemplary embodiment of the inventive concept.

Referring to FIG. 10, a service controller 500c may include a bandwidth monitor 530a, a latency monitor 530b and an information generator 550c. The bandwidth monitor 530a may have a configuration similar to or the same as that of FIG. 5 and the latency monitor 530b may have a configuration similar to or the same as that of FIG. 7.

The bandwidth monitor 530a may be enabled in response to a first enable signal EN1 and the latency monitor 530b may be enabled in response to a second enable signal EN2. When the bandwidth monitor 530a is enabled and the latency monitor 530b is disabled, the service controller 500c may perform substantially the same operation as the service controller 500a of FIG. 5. When the bandwidth monitor 530a is disabled and the latency monitor 530b is enabled, the service controller 500c may perform substantially the same operation as the service controller 500b of FIG. 7.

When both of the bandwidth monitor 530a and the latency monitor 530b are enabled, the information generator 550c may receive both of the current bandwidth level BCL and the current latency level LCL to generate the urgent information signal UGNT and the priority information signal PRT.

In an exemplary embodiment, the information generator 550c calculates an average value of the current bandwidth level BCL and the current latency level LCL to generate the urgent information signal UGNT and the priority information signal PRT based on the average value. In an exemplary embodiment, the information generator 550c calculates a weighted-average value of the current bandwidth level BCL and the current latency level LCL using different weights to generate the urgent information signal UGNT and the priority information signal PRT based on the weighted-average value. The information generator 550c may be implemented as a special function register (SFR) that performs predetermined process sequences in response to stored values and input signals.

Figure 11:
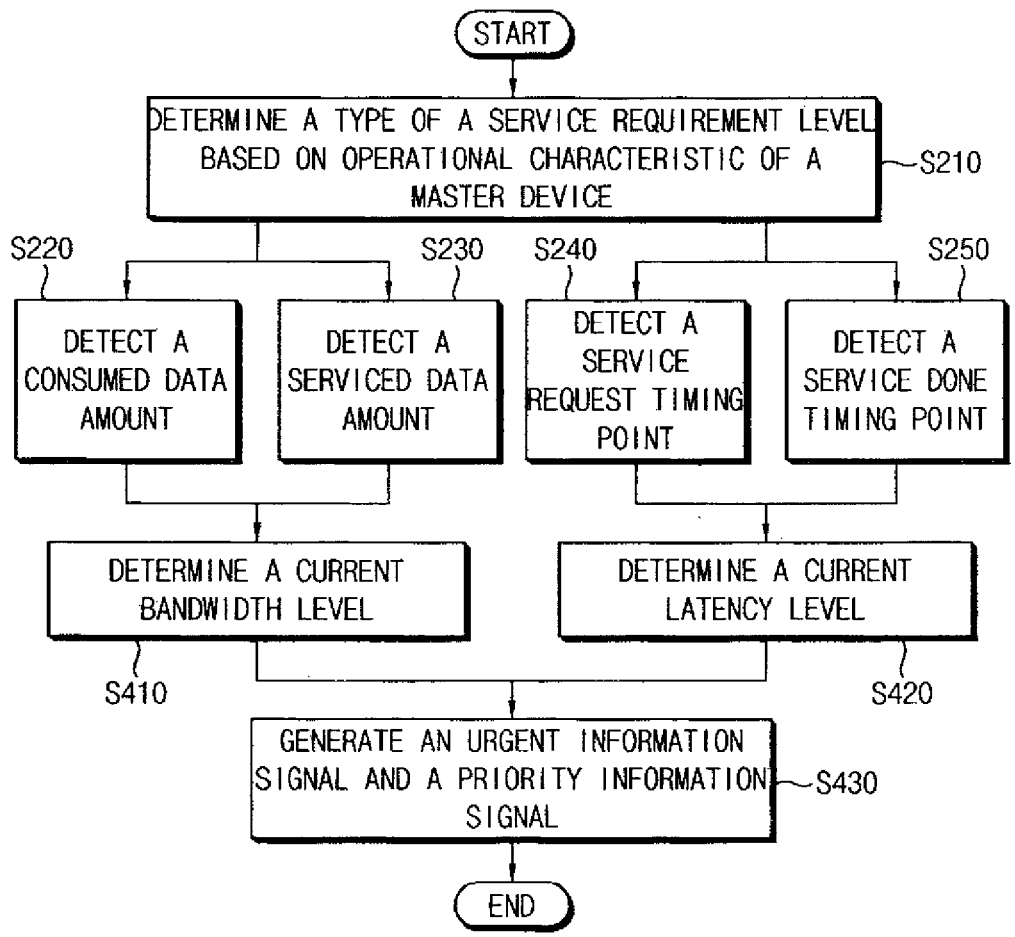
FIG. 11 is a flowchart illustrating a method of generating information signals according to an exemplary embodiment of the inventive concept.

FIG. 11 is a flowchart illustrating a method of generating information signals according to an exemplary embodiment of the inventive concept. The method of generating the information signals UGNT and PRT described with reference to FIGS. 3 through 10 is illustrated in FIG. 11.

Referring to FIG. 11, a type of a service requirement level is determined among a bandwidth and a latency based on operational characteristic of a master device (S210). Based on the determined type of the service requirement level, at least one of the above-described bandwidth and latency monitors may be included in the service controller or enabled in response to the enable signals.

The above-described bandwidth monitor detects a consumed data amount (S220) and detects a serviced data amount (S230). The band-width monitor determines a current bandwidth level (S410) based on the consumed data amount and the serviced data amount.

The above-described latency monitor detects a service request timing point (S240) and detects a service done timing point (240). The latency monitor determines a current latency level (S420) based on the service request timing point and the service done timing point.

The above-described information generator generates an urgent information signal and/or a priority information signal (S430) based on at least one of the current bandwidth level and the current latency level.

As such, the appropriate monitors for detecting the service requirement level may be determined based on the operational characteristics of the master devices to generate the urgent information signal and the priority information signal and thus the overall request flows of the system may be expedited to enhance quality of service (QOS) in the system.

Figure 12:
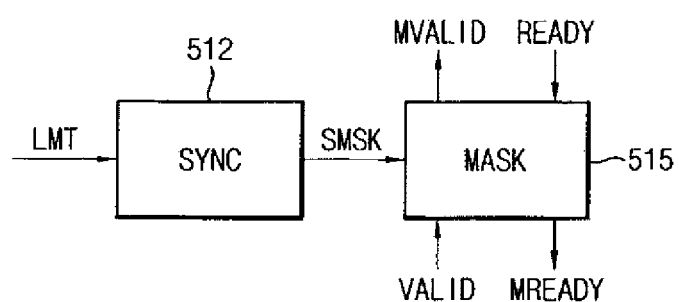
FIG. 12 is a block diagram illustrating an exemplary limiter included in the service controller of FIG. 3.

FIG. 12 is a block diagram illustrating an exemplary limiter included in the service controller of FIG. 3.

Referring to FIG. 12, a limiter 510 includes a synchronizer (SYNC) 512 and a mask unit (MASK) 515. The synchronizer 512 generates a synchronized limit signal SMSK based on the limit signal LMT from the interconnect device 10. The mask unit 515 blocks the request flow between the corresponding master device 100 and the interconnect device 10 based on the synchronized limit signal SMSK. In the handshaking scheme, the request flow may be blocked by masking the signals VALID and READY to generate masked signals MVALID and MREADY. The synchronizer 512 may control transition timing points of the limit signal LMT to prevent errors of signal transfer according to the handshaking scheme.

Figure 13A:
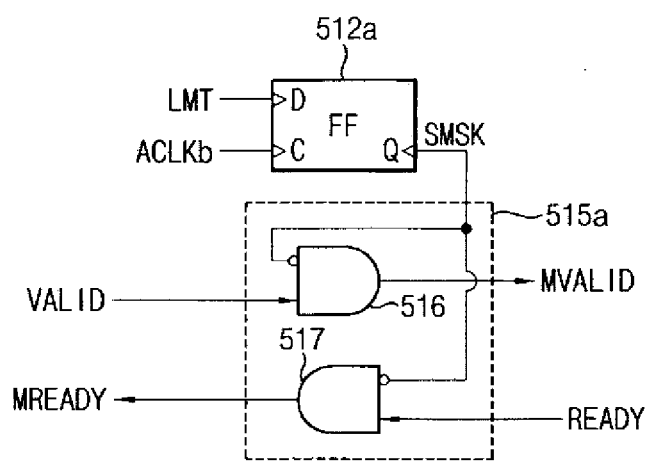
FIG. 13A is a circuit diagram illustrating an exemplary limiter included in the service controller of FIG. 3.

FIG. 13A is a circuit diagram illustrating an exemplary limiter included in the service controller of FIG. 3.

Referring to FIG. 13A, a limiter 510a includes a flip-flop 512a and a mask unit 515a. The flip-flop 512a corresponds to the synchronizer 512 of FIG. 12.

The flip-flop 512a generates a synchronized limit signal SMSK based on an inverted global clock signal ACLKb and a limit signal LMT provided from the interconnect device 10. The flip-flop 512a samples the limit signal LMT in response to a rising edge of the inverted global clock signal ACLKb to generate the synchronized limit signal SMSK. The rising edge of the inverted global clock signal ACLKb corresponds to the falling edge of the global clock signal ACLK and thus the transition timing points of the synchronized limit signal SMSK are synchronized to the falling edges of the global clock signal ACLK.

The mask unit 515a blocks the request from the corresponding master device 100 in response to the synchronized limit signal SMSK. The mask unit 515a may include a first logic gate 516 and a second logic gate 517. The first logic gate 516 outputs a masked valid signal MVALID by performing a logic operation on the synchronized limit signal SMSK and a valid signal VALID from the corresponding master device 100. The second logic gate 517 outputs a masked ready signal MREADY by performing a logic operation on the synchronized limit signal SMSK and a ready signal READY from the interconnect device 10.

When the synchronized limit signal SMSK is deactivated in a logic low level, the mask unit 515a outputs the masked valid signal MVALID and the masked ready signal MREADY having the same logic levels as the valid signal VALID and the ready signal READY, respectively. When the synchronized limit signal SMSK is activated in a logic high level, the mask unit 515a outputs the masked valid signal MVALID and the masked ready signal MREADY deactivated in the logic low level, regardless of the logic levels of the valid signal VALID and the ready signal READY.

FIG. 13B is a timing diagram illustrating an exemplary operation of the limiter of FIG. 13A.

As described with reference to FIG. 9, the master device 100 corresponding to a master interface activates a valid signal VALID when transferring a signal, and then the interconnect device 10 corresponding to a slave interface activates a ready signal READY when the interconnect device 10 is ready to receive the signal. Through the mask unit 515a, the interconnect device 10 receives the masked valid signal MVALID instead of the valid signal VALID from the master device 100 and the master device 100 receives the masked ready signal MREADY instead of the ready signal from the interconnect device 10. In other words, the master device 100 determines that the successful signal transfer is achieved when both of the valid signal VALID and the masked ready signal MREADY are activated at the same rising edge of the global clock signal ACLK, and the interconnect device 10 determines that the successful signal transfer is achieved when both of the masked valid signal MVALID and the ready signal READY are activated at the same rising edge of the global clock signal ACLK. Due to such discrepancy in determining the successful signal transfer, only one of the master device 100 and the interconnect device 10 determines that the successful signal transfer is achieved and the other of the master device 100 and the interconnect device 10 determines that the successful signal transfer is not achieved.

To prevent such errors, the limiter 510a of FIG. 13A synchronizes start and end timing points of a masked interval tMSK to the falling edges of the global clock signal ACLK. In other words, the transition timing points of the synchronized limit signal SMSK are synchronized to the falling edges of the global clock signal ACLK, that is, the rising edges of the inverted global clock signal ACLKb. Accordingly the start and end timing points (the falling edges of the global clock signal ACLK) of the masked interval tMSK may be definitely separated from the sampling timing points (the rising edges of the global clock signal ACLK) of the master device 100 and the interconnect device 10, to prevent the errors due to the discrepancy in determining the successful signal transfer.

At the sampling timing points SP1 and SP3 outside the masked interval tMSK, the general handshake operation is performed because the masked valid and ready signals MVALID and MREADY have the same logic levels as the original valid and ready signals VALID and READY, and the signal transfer is performed successfully. At the sampling timing point SP2 within the masked interval tMSK, the masked valid and ready signals MVALID and MREADY are deactivated in the logic low level even though the original valid and ready signals VALID and READY are activated in the logic high level. Thus both of the master device 100 and the interconnect device 10 determine based on the deactivated masked valid and ready signals MVALID and MREADY, respectively, that the successful signal transfer is not achieved at the timing point SP2.

Figure 14A:
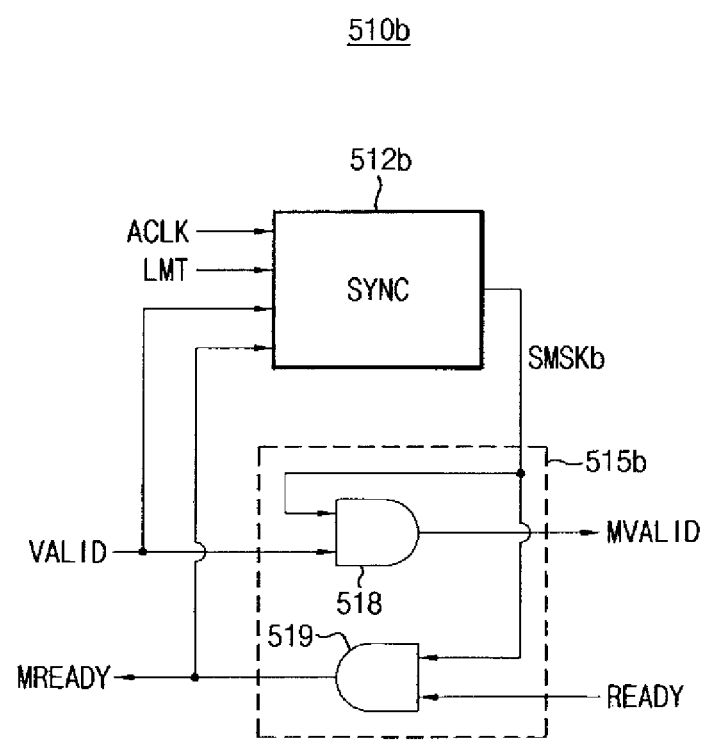
FIG. 14A is a circuit diagram illustrating an exemplary limiter included in the service controller of FIG. 3.

FIG. 14A is a circuit diagram illustrating an exemplary limiter included in the service controller of FIG. 3.

Referring to FIG. 14A, a limiter 510b includes a synchronizer 512b and a mask unit 515b.

The synchronizer 512b generates a synchronized limit signal SMSKb based on a limit signal LMT provided from the interconnect device 10, a global clock signal ACLK, a valid signal VALID and a ready signal READY. In contrast to the embodiment of FIG. 13A, the synchronized limit signal SMSKb may be activated in the logic low level. The operation of the synchronizer 512b is described below with reference to FIG. 14B.

The mask unit 515b blocks the request from the corresponding master device 100 in response to the synchronized limit signal SMSKb. The mask unit 515b may include a first logic gate 518 and a second logic gate 519. The first logic gate 518 outputs a masked valid signal MVALID by performing a logic operation on the synchronized limit signal SMSKb and a valid signal VALID from the corresponding master device 100. The second logic gate 519 outputs a masked ready signal MREADY by performing a logic operation on the synchronized limit signal SMSKb and a ready signal READY from the interconnect device 10.

When the synchronized limit signal SMSKb is deactivated in a logic high level, the mask unit 515b outputs the masked valid signal MVALID and the masked ready signal MREADY having the same logic levels as the valid signal VALID and the ready signal READY, respectively. When the synchronized limit signal SMSKb is activated in a logic low level, the mask unit 515b outputs the masked valid signal MVALID and the masked ready signal MREADY deactivated in the logic low level, regardless of the logic levels of the valid signal VALID and the ready signal READY.

Figure 14B:
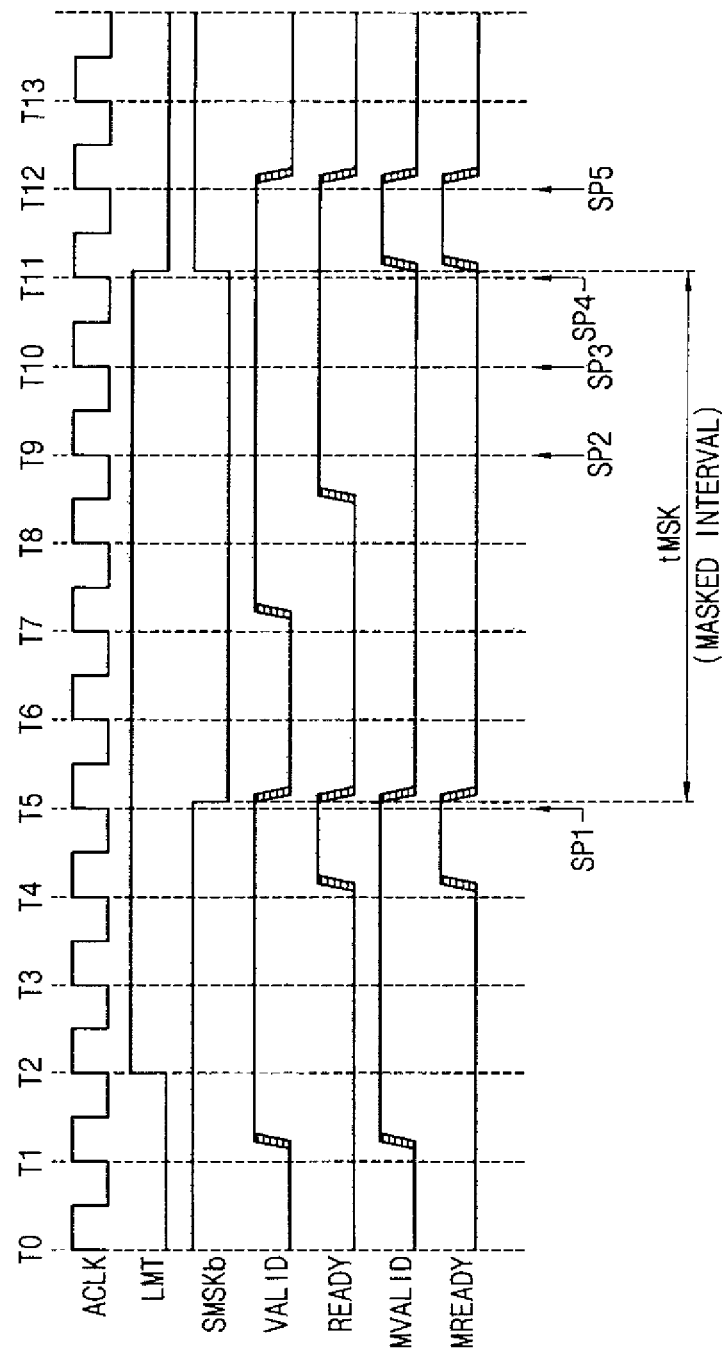
FIG. 14B is a timing diagram illustrating an exemplary operation of the limiter of FIG. 14A.

FIG. 14B is a timing diagram illustrating an exemplary operation of the limiter of FIG. 14A.

As described with reference to FIG. 9, the master device 100 corresponding to a master interface activates a valid signal VALID when transferring a signal, and then the interconnect device 10 corresponding to a slave interface activates a ready signal READY when the interconnect device 10 is ready to receive the signal. Through the mask unit 515b, the interconnect device 10 receives the masked valid signal MVALID instead of the valid signal VALID from the master device 100 and the master device 100 receives the masked ready signal MREADY instead of the ready signal from the interconnect device 10. In other words, the master device 100 determines that the successful signal transfer is achieved when both of the valid signal VALID and the masked ready signal MREADY are activated at the same rising edge of the global clock signal ACLK, and the interconnect device 10 determines that the successful signal transfer is achieved when both of the masked valid signal MVALID and the ready signal READY are activated at the same rising edge of the global clock signal ACLK.

Due to such discrepancy in determining the successful signal transfer, only one of the master device 100 and the interconnect device 10 determines that the successful signal transfer is achieved and the other of the master device 100 and the interconnect device 10 determines that the successful signal transfer is not achieved.

To prevent such errors, the synchronizer 512b in the limiter 510b of FIG. 14B synchronizes a start timing point of a masked interval tMSK to the timing point just after the successful signal transfer is achieved. For example, the synchronizer 512b activates the masked limit signal SMSKb in the logic low level just after the sampling timing point SP1 when the successful signal transfer is achieved. The synchronizer 512b may synchronize an end timing point of the masked interval tMSK to the deactivation timing point of the limit signal LMT.

At the sampling timing points SP1 and SP5 outside of the masked interval tMSK, the general handshake operation is performed because the masked valid and ready signals MVALID and MREADY have the same logic levels as the original valid and ready signals VALID and READY, and the signal transfer is performed successfully. At the sampling timing points SP2, SP3 and SP4 within the masked interval tMSK, the masked valid and ready signals MVALID and MREADY are deactivated in the logic low level regardless of the original valid and ready signals VALID and READY. Thus both of the master device 100 and the interconnect device 10 determine based on the deactivated masked valid and ready signals MVALID and MREADY, respectively, that the successful signal transfer is not achieved at the timing points SP2, SP3 and SP4.

Figure 15:
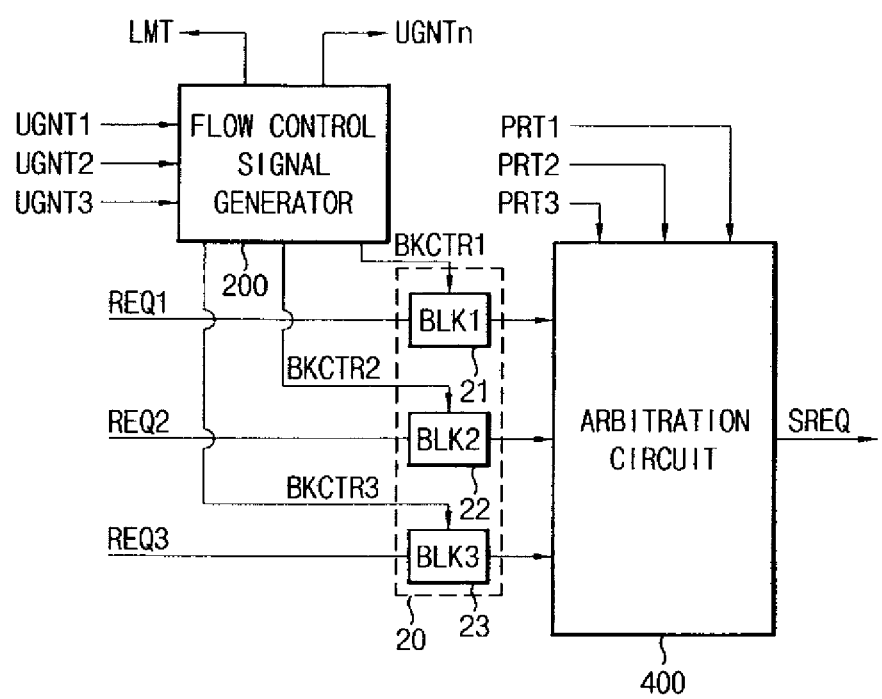
FIG. 15 is a block diagram illustrating an interconnect device according to an exemplary embodiment of the inventive concept.

FIG. 15 is a block diagram illustrating an interconnect device according to an exemplary embodiment of the inventive concept.

Referring to FIG. 15, an interconnect device 10a includes an arbitration circuit 400, a flow control signal generator 200 and a block circuit 20.

The arbitration circuit 400 outputs a selected request SREQ among requests REQ1, REQ2 and REQ3 from the master devices 101, 102 and 103 in FIG. 1 based on the priority information signals RPR1, RPT2 and PRT3.

Figure 16:
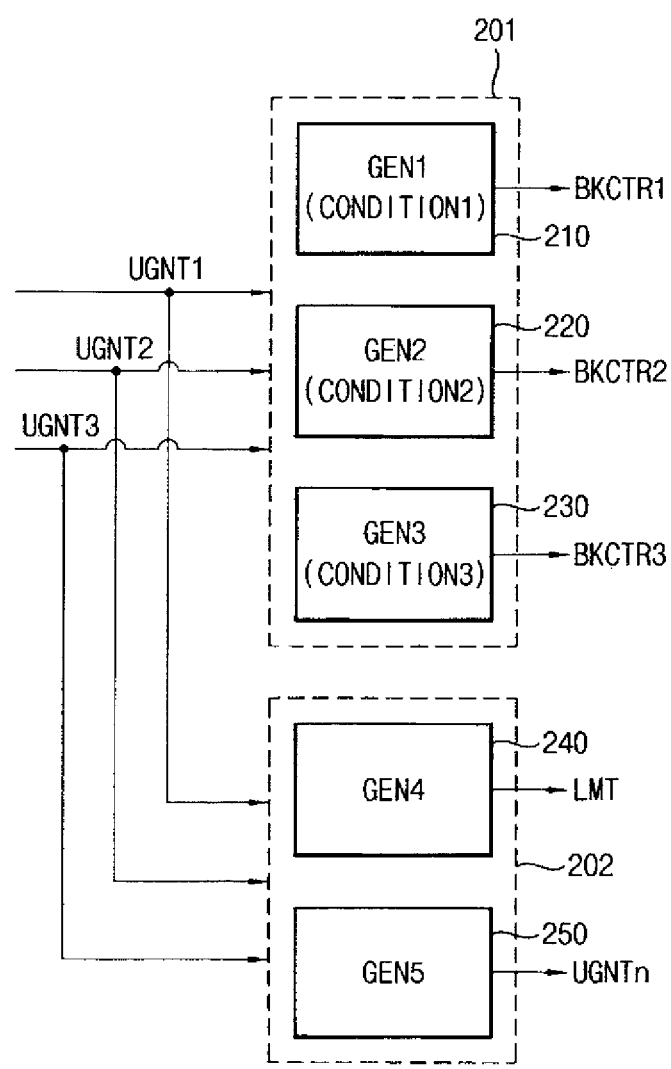
FIG. 16 is a block diagram illustrating an exemplary flow control signal generator included in the interconnect device of FIG. 15.

The flow control generator 200 may include a block control signal generator 201 as illustrated in FIG. 16 and the block control signal generator 201 generates block control signals BKCTR1, BKCTR2 and BKCTR3 based on the urgent information signals UGNT1, UGNT2 and UGNT3. The flow control generator 200 may further include a limit signal generator 202 to generate a limit signal LMT and a combination urgent information signal UGNTn as will described with reference to FIG. 16.

The block circuit 20 blocks the requests REQ1, REQ2 and REQ3 from being input to the arbitration circuit 400 in response to the block control signals BKCTR1, BKCTR2 and BKCTR3. The block circuit 20 may include a plurality of block units BLK1, BLK2 and BLK3 to block the requests REQ1, REQ2 and REQ3 in response to the block control signals BKCTR1, BKCTR2 and BKCTR3, respectively.

FIG. 16 is a block diagram illustrating an exemplary flow control signal generator included in the interconnect device of FIG. 15.

Referring to FIG. 16, a flow control signal generator 200 includes a block control signal generator 201 and a limit signal generator 202.

The block control signal generator 201 may include first, second and third generators 210, 220 and 230 for generating the block control signals BKCTR1, BKCTR2 and BKCTR3, respectively, which are provided to the block circuit 20 in FIG. 15, based on the urgent information signals UGNT1, UGNT2 and UGNT3. As will be described with reference to FIGS. 17 through 20, the block control signal generator 201 may activate each of the block control signals BKCTR1, BKCTR2 and BKCTR3 when each of conditions different from each other is satisfied, where the conditions depend on operational characteristics of the respective master devices 101, 102 and 103.

The first generator 210 may activate the first block control signal BKCTR1 to block the flow of the first request REQ1 from the first master device 101 when the first condition is satisfied. The second generator 220 may activate the second block control signal BKCTR2 to block the flow of the second request REQ2 from the second master device 102 when the second condition is satisfied. The third generator 230 may activate the third block control signal BKCTR3 to block the flow of the third request REQ3 from the third master device 103 when the third condition is satisfied.

As such, by setting the different conditions considering the operational characteristics of the master devices, the request flows of the respective master devices may be controlled independently and efficiently.

The limit control signal generator 202 may include fourth and fifth generators 240 and 250 to generate the above-described limit signal LMT and a combination urgent information signal UGNTn, respectively, which will be further described with reference to FIGS. 21 and 22.

Figures 17, 18:
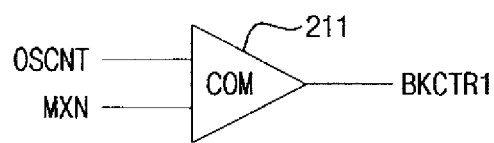
FIG. 17 is a diagram illustrating exemplary conditions for activating block control signals generated by the flow-control signal generator of FIG. 16.
FIGS. 18, 19 and 20 are circuit diagrams illustrating an exemplary block control signal generator included in the flow control signal generator of FIG. 16.

FIG. 17 is a diagram illustrating exemplary conditions for activating block control signals generated by the flow-control signal generator of FIG. 16.

As illustrated in FIG. 17, the conditions for activating the first, second and third block control signals BKCTR1, BKCTR2 and BKCTR3 may be set different from each other. The condition of a first case is strictest, the condition of a second case is relieved and the condition of a third case is further relieved.

The condition of the first case may be strictly restricted to an issue full state when the arbitration circuit 400 cannot transfer the selected request SREQ to a next slave. The next slave may be a next bus that is cascade-coupled to a bus including the arbitration circuit 400 or the slave device directly coupled to the arbitration circuit 400.

When the system 1000 of FIG. 1 adopts a protocol supporting multiple outstanding transactions or multiple outstanding requests, at least one request queue or a register circuit may be included on a signal path between the interconnect device 10 and a target slave device. The request queue may store requests that are issued from the master device but have not completed yet. An outstanding count OSCNT is defined as the number of the requests currently stored in the request queue directly coupled to output of the arbitration circuit 400. The issue full state occurs when the outstanding count OSCNT becomes the same as a maximum number MXN.

The condition of the second case may be extended to include a very urgent state in addition to the issue full state. The condition that the outstanding count OSCNT has to be equal to or greater than a first number SVUN may be added to the condition of the very urgent state. The first number SVUN may be set smaller than the maximum number MXN.

The condition of the third case may be further extended to include an urgent state in addition to the issue full state and the very urgent stage. The condition that the outstanding count OSCNT has to be equal to or greater than a second number BVUN may be added to the condition of the very urgent state. The condition that the outstanding count OSCNT has to be equal to or greater than a third number BUN may be added to the condition of the urgent state. The second number BVUN may be set smaller than the maximum number MXN, and the third number BUN may be set smaller than the second number BVUN.

The master device or the master intellectual property (IP) may be divided into a hard realtime IP, a soft realtime IP and a best effort IP depending on the type or the operational characteristic of the master IP.

The hard realtime IP may be an IP such as a display device that consumes data steadily and thus requires a necessary bandwidth. An underrun of a data buffer in the hard realtime IP may be caused if the necessary bandwidth is not satisfied. The hard realtime IP buffers the serviced data sufficiently in the data buffer if the necessary bandwidth is satisfied and controls the request flow itself such that the hard realtime IP issues the request according to the amount of the consumed data.

To reduce manufacturing cost, an external modem chip may share a memory in the SOC. Such an external modem chip may not operate normally if an average latency requirement level is not satisfied. It may be difficult to determine and fix the average latency requirement level because the type of the modem chip varies.

The soft realtime IP may be an IP such as a video codec that requires an average operation time. The video codec may have a frame rate such as 30 or 60 frames per second and may require an average decode/encode time. The bandwidth requirement level of the video codec may be changed according to respective frames and the video codec may require an average encoding time and/or an average decoding time. The video codec tends to precede the encoding/decoding of the next frame as soon as possible if the request flow is not controlled but the issue of the requests is limited due to dependency between the previously and currently processed data. Thus the operation speed of the video codec may satisfy the determined frame rate if the required bandwidth and/or latency are secured, but the operation speed of the codec may be sharply decreased if the latency becomes greater than a threshold value.

The best effort IP may be an IP such as two-dimensional or a three-dimensional graphics engine that issues requests endlessly if the request flow is not controlled and thus request flow control is needed in the best effort IP. It is desirable to support maximum service requirement levels of the best effort IP if the other IP of higher priority than the best effort IP is not in the urgent state. If the other IP is in the urgent state, the request flow from the best effort IP is limited so that the other IP of the higher priority may exit from the urgent state.

The latency-oriented IP such as a central processing unit (CPU) may have a variable bandwidth requirement level depending on the situation but its performance is directly influenced by an average latency. The request flow of the latency-oriented IP needs to be controlled based on the latency because the average bandwidth requirement level may not be defined.

For example, the strictest condition of the first case in FIG. 17 may be applied to control the request flow of the hard realtime IP. Referring to FIG. 15, when the first request REQ1 is issued from the hard realtime IP, the first block control signal BKCTR1 may be activated to block the first request REQ1 from being input to the arbitration circuit 400 when the strictest condition of the first case is satisfied.

For example, the relieved condition of the second case in FIG. 17 may be applied to control the request flow of the soft realtime IP. Referring to FIG. 15, when the second request REQ2 is issued from the soft realtime IP, the second block control signal BKCTR2 may be activated to block the second request REQ2 from being input to the arbitration circuit 400 when the relieved condition of the second case is satisfied.

For example, the further relieved condition of the third case in FIG. 17 may be applied to control the request flow of the best effort IP. Referring to FIG. 15, when the third request REQ3 is issued from the best effort IP, the third block control signal BKCTR3 may be activated to block the third request REQ3 from being input to the arbitration circuit 400 when the further relieved condition of the third case is satisfied.

Figure 19:
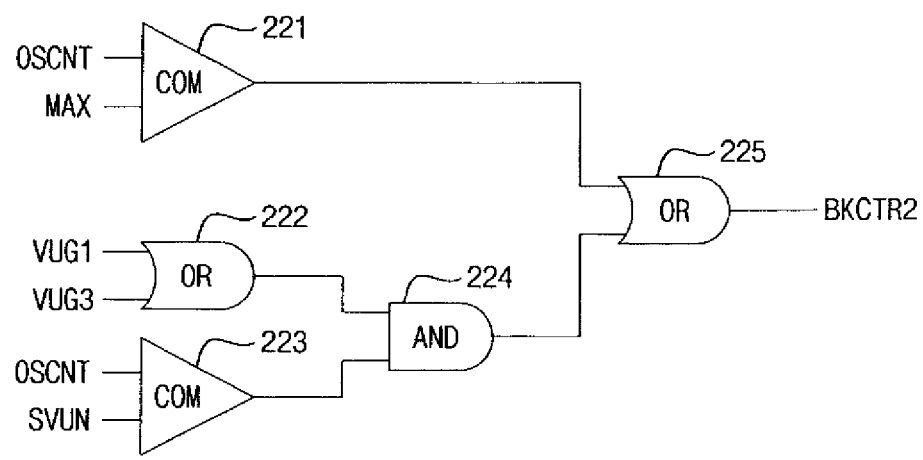
Figure 20:
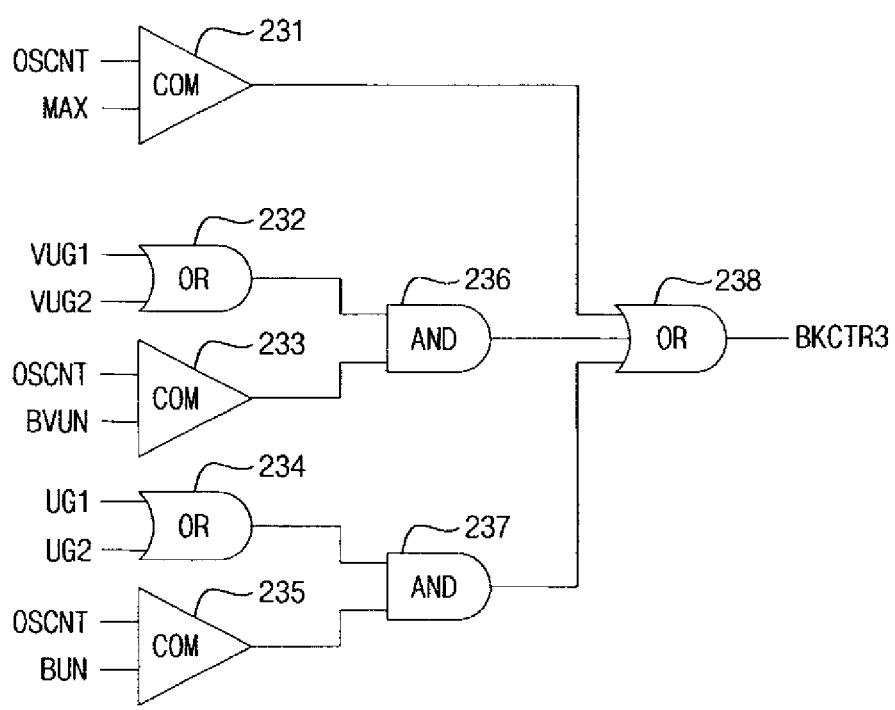

FIGS. 18, 19 and 20 are circuit diagrams illustrating an exemplary block control signal generator included in the flow control signal generator of FIG. 16.

For example, the block control signal generator 201 in FIG. 16 may include the first generator 210 to which the strictest condition of the first case is applied, the second generator 220 to which the relieved condition of the second case is applied and the third generator 230 to which the further relieved condition of the third case is applied.

Referring to FIG. 18, the first generator 210 may include a comparator 211 configured to generate the first block control signal BKCTR1 based on the outstanding count OSCNT and the maximum number MXN.

The comparator 211 may activate the first block control signal BKCTR1 when the outstanding count OSCNT is equal to the maximum number MXN. As a result, the first generator 210 may generate the first block control signal BKCTR1 that is activated when the condition of the first case in FIG. 17 is satisfied. The first block control signal BKCTR1 is provided to the first block unit BLK1 to control the flow of the first request REQ1 from the first master device 101.

Referring to FIG. 19, the second generator 220 may include a first comparator 221, a first OR gate 222, a second comparator 223, a first AND gate 224 and a second OR gate 225.

The first comparator 221 may activate its output signal when the outstanding count OSCNT is equal to the maximum number MXN. The first OR gate 222 may activate its output signal when at least one of the first and third very urgent flag signals VUG1 and VUG3 is activated. The second comparator 223 may activate its output signal when the outstanding count OSCNT is equal to or greater than the first number SVUN. The first AND gate 224 may activate its output signal when both of the output signals of the first OR gate 222 and the second comparator 223 are activated. The second OR gate 225 may activate the second block control signal BKCTR2 when at least one of the output signals of the first comparator 221 and the first AND gate 224 is activated.

As a result, the second generator 220 may generate the second block control signal BKCTR2 that is activated when the condition of the second case in FIG. 17 is satisfied. The second block control signal BKCTR2 is provided to the second block unit BLK2 to control the flow of the second request REQ2 from the second master device 102. Accordingly, the second very urgent flag signal VUG2 representing the state of the second master device 102 is not used in activating the second block control signal BKCTR2.

Referring to FIG. 20, the third generator 230 may include a first comparator 231, a first OR gate 232, a second comparator 233, a second OR gate 234, a third comparator 235, a first AND gate 236, a second AND gate 237 and a third OR gate 238.

The first comparator 231 may activate its output signal when the outstanding count OSCNT is equal to the maximum number MXN. The first OR gate 232 may activate its output signal when at least one of the first and second very urgent flag signals VUG1 and VUG2 is activated. The second comparator 233 may activate its output signal when the outstanding count OSCNT is equal to or greater than the second number BVUN. The second OR gate 234 may activate its output signal when at least one of the first and second urgent flag signals UG1 and UG2 is activated. The third comparator 235 may activate its output signal when the outstanding count OSCNT is equal to or greater than the third number BUN.

The first AND gate 236 may activate its output signal when both of the output signals of the first OR gate 232 and the second comparator 233 are activated. The second AND gate 237 may activate its output signal when both of the output signals of the second OR gate 234 and the third comparator 235 are activated. The third OR gate 238 may activate the third block control signal BKCTR3 when at least one of the output signals of the first comparator 231, the first AND gate 236 and the second AND gate 237 is activated.

As a result, the third generator 230 may generate the third block control signal BKCTR3 that is activated when the condition of the third case in FIG. 17 is satisfied. The third block control signal BKCTR3 is provided to the third block unit BLK3 to control the flow of the third request REQ3 from the third master device 103. Accordingly, the third very urgent flag signal VUG3 and the third urgent flag signal UG3 representing the state of the third master device 103 are not used in activating the third block control signal BKCTR3.

As such, the block control signal generator 201 may activate the block control signals BKCTR1, BKCTR2 and BKCTR3, respectively, when the conditions different from each other are satisfied, respectively. Accordingly, the respective request flows may be controlled independently and efficiently according to the operational characteristics of the master devices.

Figure 21:
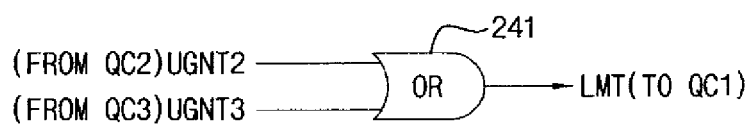
FIGS. 21 and 22 are circuit diagrams illustrating an exemplary limit signal generator included in the flow control signal generator of FIG. 16.
Figure 22:
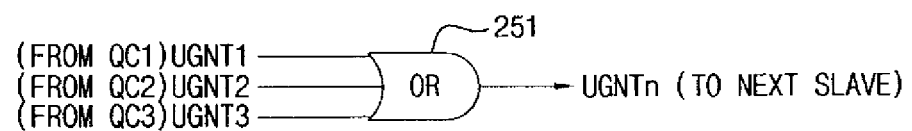

FIGS. 21 and 22 are circuit diagrams illustrating an exemplary limit signal generator included in the flow control signal generator of FIG. 16.

For example, the limit signal generator 202 in FIG. 16 may include the fourth generator 240 to generate the limit signal LMT for controlling the request flow between the first master device 101 and the interconnect device 10 illustrated in FIG. 1, and the fifth generator 250 to generate the combination urgent information signal UGNTn for transferring the urgent state of at least one of the master devices 101, 102 and 102 to the next slave.

Referring to FIG. 21, the fourth generator 240 may include a logic gate 241 configured to generate the limit signal LMT based on the second and third urgent information signals UGNT2 and UGNT3. For example, the logic gate 241 may perform an OR operation on the second and third urgent flag signals UG2 and UG3 or the second and third very urgent flag signals VUG2 and VUG3 to generate the limit signal LMT.

As such, the fourth generator 240 in the limit signal generator 202 may generate the limit signal LMT based on the urgent information signals UGNT2 and UGNT3 that are generated by the service controllers QC2 and QC3 except the service controller QC1 receiving the limit signal LMT. Thus the urgent state occurring in the master device does not limit the request flow from the same master device.

Referring to FIG. 22, the fifth generator 250 may include a logic gate 251 that generates the combination urgent information signal UGNTn based on the first urgent information signal UGNT1, the second urgent information signal UGNT2 and the third urgent information signal UGNT3. For example, the logic gate 251 may perform an OR operation on the first, second and third urgent flag signals US1, UG2 and UG3 or the first, second and third very urgent flag signals VUG1, VUG2 and VUG3 to generate the combination urgent information signal UGNTn.

As such, the fifth generator 250 in the limit signal generator 202 may generate the combination urgent information signal UGNTn that represents the urgent state associated with all of the requests REQ1, REQ2 and REQ3 transferred through the same arbitration circuit 400 as illustrated in FIG. 15. The combination urgent information signal UGNTn may be transferred to the next slave and used to control the request flow between the slave device and the master device that is not associated with the generation of the combination urgent information signal UGNTn, as will be described with reference to FIGS. 23 and 24.

Figure 23:
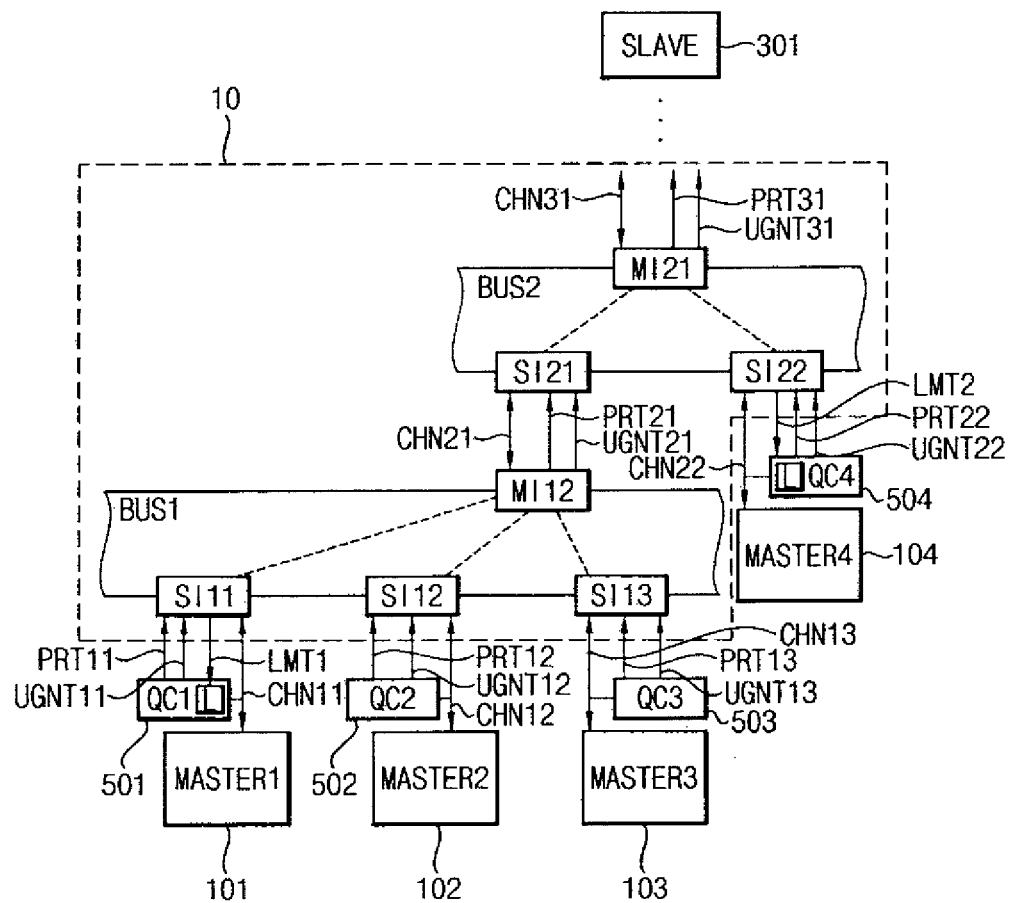
FIG. 23 is a block diagram illustrating a system of a multi-layer structure according to an exemplary embodiment of the inventive concept.

FIG. 23 is a block diagram illustrating a system of a multi-layer structure according to an exemplary embodiment of the inventive concept. The configuration of the system 1000a of FIG. 23 is similar to the configuration of the system 1000 of FIG. 1.

Referring to FIG. 23, a system 1000a includes master devices (MASTERi, i=1, 2, 3, 4) 101, 102, 103 and 104, at least one slave device (SLAVE) 301, service controllers (QCi) 501, 502, 503 and 504 and an interconnect device 10.

The master devices 101, 102, 103 and 104 and the slave devices 301 may be referred to as an intellectual property, respectively. For example, the master devices could be IP cores or IP blocks. While FIG. 23 shows 4 master devices, 4 slave devices, and 4 service controllers, the number of each may vary in alternate embodiments.

The interconnect device 10 may be a multi-layer interconnect device including a first bus BUS1 to which the first, second and third master devices 101, 102 and 103 are directly coupled and at least one second bus BUS2 that is cascade-coupled between the first bus BUS1 and the slave device 301. The fourth master device 104 is directly coupled to the second bus BUS2 and may transfer signals with the slave device 301 without passing through the first bus BUS1.

The master devices 101, 102, 103 and 104 may generate requests to demand services from the target slave device 301, where each service may be used as a common resource. The requests may be included in respective channel signals CHN11, CHN12, CHN13 and CHN22 and transferred to the interconnect device 10. The interconnect device 10 transfers the requests to the target slave device 301 sequentially through interfaces SI11, SI12, SI13, MI12 SI21, SI22 and MI21.

When a plurality of requests are in competition, the arbitration circuit in the interconnect device 10 selects one request to be transferred to the next stage. For example, the master interfaces MI12 and MI21 may include the arbitration circuit 400 as described with reference to FIG. 15 and the slave interfaces SI11, SI12, SI13, SI21 and SI22 may include a request queue for supporting the multiple outstanding requests as will be described with reference to FIG. 27.

The service controllers 501, 502, 503 and 504 generate the urgent information signals UGNT11, UGNT12, UGNT13 and UGNT22, and the priority information signals PRT11, PRT12, PRT13 and PRT22 (e.g., in realtime), respectively.

The urgent information signals UGNT11, UGNT12 and UGNT13, and the priority information signals PRT11, PRT12 and PRT13 from the first, second and third master devices 101, 102 and 103 may be transferred to the second bus BUS2 through the first bus BUS1 to be provided in the arbitrating operation in the second bus BUS2 and the control of the request flows between the second bus BUS2 and the target slave device 301.

For example, the priority information signals PRT11, PRT12 and PRT 13 from the master devices 101, 102 and 103 may be transferred to the second bus BUS2 as the priority information signal PRT21 output from the master interface MI12 of the first bus BUS1 and the priority information signal PRT21 may be used in the arbitrating operation in the second bus BUS2. In an exemplary embodiment, the priority information signal PRT21 is transferred in a form of a flag signal from the first bus BUS1 to the second bus BUS2. In another exemplary embodiment, the priority information signal PRT21 is transferred from the first bus BUS1 to the second bus BUS2 in a method of upgrading a priority stored in the request queue included in the second bus BUS2.

As will be described with reference to FIG. 27, the first bus BUS1 and the second bus BUS2 may include the request queues or the register circuits for storing the multiple outstanding requests. The priorities of the requests stored in the request queues may be upgraded (e.g., in realtime) based on the priority information signals, independently of the arbitrating operations in the first and second buses BUS1 and BUS2.

FIG. 23 illustrates an embodiment where the first service controller 501 and the fourth service controller 504 include a limiter L, respectively. The request flow between the first master device 101 and the first bus BUS1 may be controlled based on the first limit signal LMT1 that is generated as described with reference to FIG. 21. The request flow between the fourth master device 104 and the second bus BUS2 may be controlled based on the second limit signal LMT2 that is generated as will be described with reference to FIG. 24.

Figure 24:
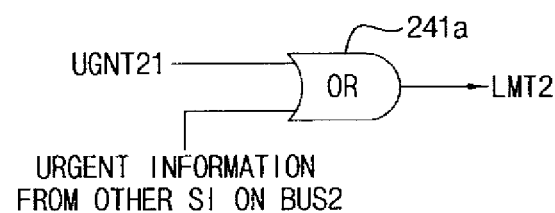
FIG. 24 is a circuit diagram illustrating an exemplary limit signal generator of a second bus in the system of FIG. 23.

FIG. 24 is a circuit diagram illustrating an exemplary limit signal generator of a second bus BUS2 in the system of FIG. 23.

Referring to FIG. 24, a limit signal generator 240a included in the second bus BUS2 is implemented with a logic gate 241a that performs a logic operation on the combination urgent information signal UGNT21 from the first bus BUS1 and the urgent information signal transferred from the slave interface on the second bus BUS2 except for the urgent information signal UGNT22 to generate the second limit signal LMT2. The urgent information signal UGNT22 associated with the fourth master device 104 is excluded in generating the second limit signal LMT2 because the second limit signal LMT2 is used to control the request flow of the fourth master device 104 itself.

The second bus BUS2 may control, based on the combination urgent information signal UGNT21, the request flow between the target slave device 301 and the fourth master device 104 that is coupled to the second bus BUS2 without passing through the first bus BUS1. The combination urgent information signal UGNT21 may be generated by the logic gate of FIG. 22 based on the urgent information signals UGNT11, UGNT12 and UGNT13 associated with the first, second and third master devices 101, 102 and 103 directly coupled to the first bus BUS1. The limit signal generator 240a in the second bus BUS2 may generate the second limit signal LMT2 based on the combination urgent information signal UGNT21 and the second limit signal LMT2 may be used to control the request flow between the fourth master device 104 and the second bus BUS2.

As such, the urgent information signals UGNT11, UGNT12 and UGNT13 associated with the master devices 101, 102 and 103 directly coupled to the first bus BUS1 may be used in controlling the request flow of the fourth master device 104 coupled to the second bus BUS2. In at least one exemplary embodiment, even though not illustrated in FIG. 23, the urgent information signal UGNT22 generated by the fourth service controller 504 of the fourth master device 104 may be provided to the first bus BUS1 through the second bus BUS2. In this embodiment, the urgent information signal UGNT22 is used as an additional input to the generator 240 as illustrated in FIG. 21 to activate the first limit signal LMT1 provided to the first service controller 501. As a result, the urgent state of the fourth master device 104, the request of which is transferred to the slave device 301 without passing through the first bus BUS1, may be used in controlling the request flow of the first master device 101 that is coupled to the first bus BUS1.

Figure 25:
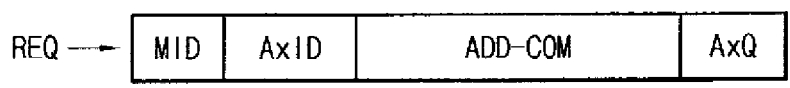
FIG. 25 is a diagram illustrating an exemplary structure of requests stored in a bus.
Figure 26:
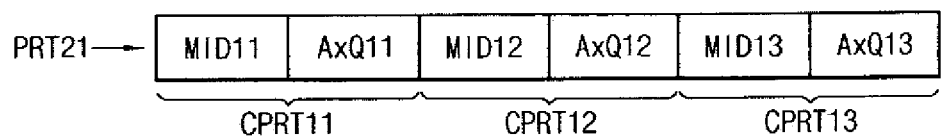
FIG. 26 is a diagram illustrating an exemplary structure of priority information transferred between buses.

FIG. 25 is a diagram illustrating an exemplary structure of requests stored in a bus, and FIG. 26 is a diagram illustrating an exemplary structure of priority information transferred between buses.

Referring to FIG. 25, the respective request REQ stored in the bus includes a master identifier MID indicating the master device that issued the request REQ, a request identifier AxID for distinguishing the request REQ from the other requests from the same master device, an address-command ADD-COM representing the contents of the request REQ, and a priority AxQ of the request REQ. For example, the requests may be stored in register circuits 610, 620, 630 and 710 in FIG. 27 in the format of the request REQ of FIG. 25.

Referring to FIG. 26, the priority information signal PRT21 transferred between the buses, that is, transferred from the register circuits 610, 620 and 630 of the first bus BUS1 to the register circuit 710 of the second bus BUS2 may include a first coded priority information CPRT11 from the first register circuit 610, a second coded priority information CPRT12 from the second register circuit 620 and a third coded priority information CPRT13 from the third register circuit 630. The coded priority information CPRT11, CPRT12 and CPRT13 may include master identifiers MID11, MID12 and MID13 indicating the master devices and priorities AxQ11, AxQ12 and AxQ13 of the corresponding master devices. Such information PRT21 may be transferred between the buses BUS1 and BUS2 to be used in the arbitrating operation in the post bus BUS2 in addition to the front bus BUS1.

Figure 27:
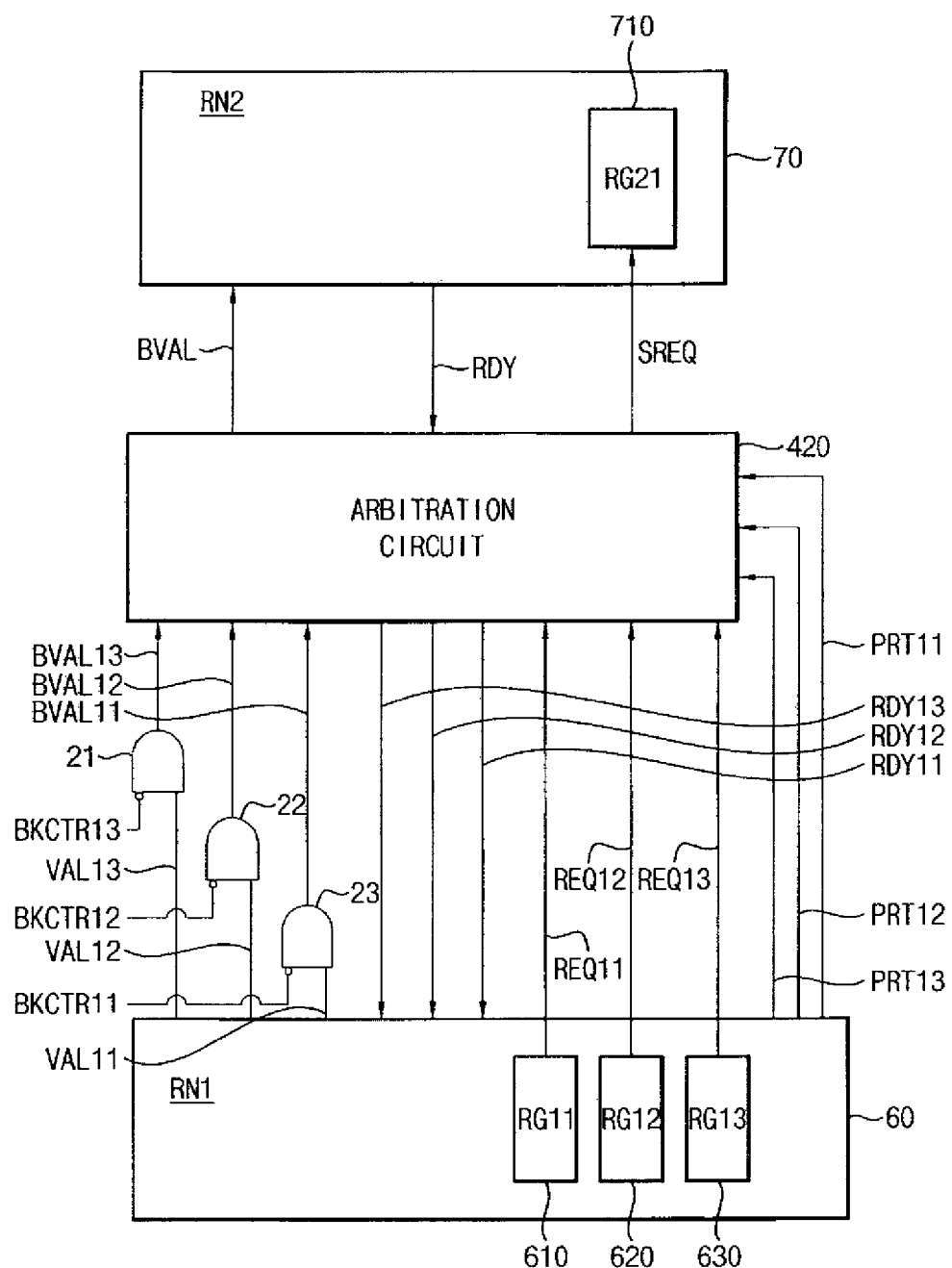
FIG. 27 is a block diagram illustrating an exemplary interconnect device included in the system of FIG. 23.

FIG. 27 is a block diagram illustrating an exemplary interconnect device included in the system of FIG. 23.

Referring to FIG. 27, an interconnect device 10c includes a first register circuit (RG11) 610, a second register circuit (RG12) 620, a third register circuit (RG13) 630 and a fourth register circuit (RG21) 710 and an arbitration circuit 420.

The first, second and third register circuits 610, 620 and 630 in a first register node (RN1) 60 corresponding to a front stage output the first, second and third requests REQ11, REQ12 and REQ13, respectively. The fourth register circuit 710 in a second register node (RN2) 70 corresponding to a post stage may receive sequentially the selected request SREQ from the arbitration circuit 420.

As described above, the requests REQ11, REQ12 and REQ13 may be transferred according to the handshake scheme using valid signals VAL11, VAL12 and VAL13 and ready signals RDY11, RDY12 and RDY13. In this example, the block circuit 20 in FIG. 15 may be implemented with logic gates 21, 22 and 23 configured to block the valid signals VAL11, VAL12 and VAL13 and output blocked valid signals BVAL11, BVAL12 and BVAL13 in response to the block control signals BKCTR11, BKCTR12 and BKCTR13, respectively.

The arbitration circuit 420 receives the blocked valid signals BVAL11, BVAL12 and BVAL13 and performs the arbitrating operations on the requests corresponding to the activated blocked valid signals. The request corresponding to the activated block control signal may be excluded from the arbitrating operation and thus the block control signals BKCTR11, BKCTR12 and BKCTR13 may be used to block the requests REQ12, REQ12 and REQ13 from being input to the arbitration circuit 420. The arbitration circuit 420 activates one of the ready signals RDY11, RDY12 and RDY13 corresponding to the selected request SREQ and thus the handshake transfer of the selected request may be performed. Also the selected request SREQ may be transferred between the arbitration circuit 420 and the fourth register 710 according to the handshake scheme using the valid signal BVAL and the ready signal RDY.

As such, the block circuit including the logic gates 21, 22 and 23 may control the request flows between the interface circuits or the register nodes 60 and 70 by blocking the valid signals VAL11, VAL12 and VAL13 in response to the block control signals BKCTR11, BKCTR12 and BKCTR13, respectively.

Figure 28:
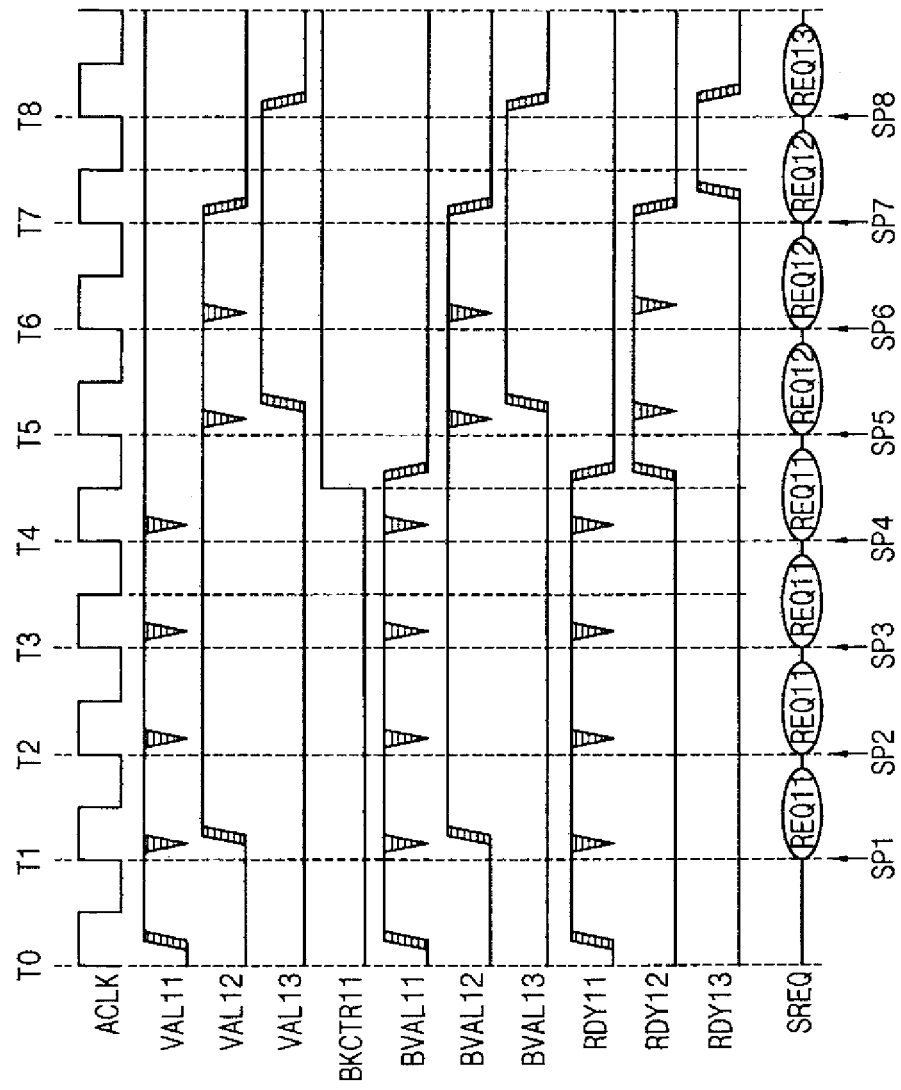
FIG. 28 is a timing diagram illustrating an exemplary operation of the interconnect device of FIG. 27.

FIG. 28 is a timing diagram illustrating an operation of the interconnect device of FIG. 27.

FIG. 28 illustrates an example where the first block control signal BKCTR11 is activated between the timing points T4 and T5. Referring to FIG. 28, the first blocked valid signal BVAL11 has the same logic level as the first valid signal VAL11 before the first block control signal BKCTR11 is activated and the first blocked valid signal BVAL11 is deactivated regardless of the first valid signal VAL11 after the first block control signal BKCTR11 is activated. It is assumed that the second and third block control signals BKCTR12 and BKCTR13 are not activated, and thus the second and third blocked control signals BVAL12 and BVAL13 are the same as the second and third valid signals VAL12 and VAL13, respectively.

The arbitration circuit 420 outputs each selected request at each of sampling timing points SP1 through SP8. For example, At the sampling timing points SP1, SP2, SP3 and SP4 before the activation of the first block control signal BKCTR11, the arbitration circuit 420 outputs the first requests REQ11 of the highest priority as the selected request SREQ and activates the first ready signal RDY11 to inform of a successful transfer of the first requests REQ11 to the interface circuit (or the register node) 60. The second valid signal VAL12 corresponding to the unselected second request REQ12 maintains the activated state. When the first block control signal BKCTR11 is activated, the first blocked valid signal BVAL11 is deactivated even though the first valid signal VAL11 is activated. Thus the arbitration circuit 420 excludes the first request REQ11 and performs the arbitrating operation on the second and third requests REQ12 and REQ13.

At the sampling timing points SP5, SP6 and SP7, the first request REQ11 of the highest priority is excluded due to the deactivation of the first blocked valid signal BVAL11. The arbitration circuit 420 selects the second request REQ12 of the next priority and activates the second ready signal RDY12 to inform of a successful transfer of the second request REQ12 to the register node 60. At the sampling timing point SP8, the arbitration circuit 420 selects the third request REQ13 because only the third blocked valid signal BVAL13 is activated, and activates the third ready signal RDY13 to inform of a successful transfer of the third request REQ13 to the register node 60.

As such, the block circuit including the logic gates 21, 22 and 23 may control the request flows between the interface circuits or the register nodes 60 and 70 by blocking the valid signals VAL11, VAL12 and VAL13 in response to the block control signals BKCTR11, BKCTR12 and BKCTR13, respectively.

Figure 29:
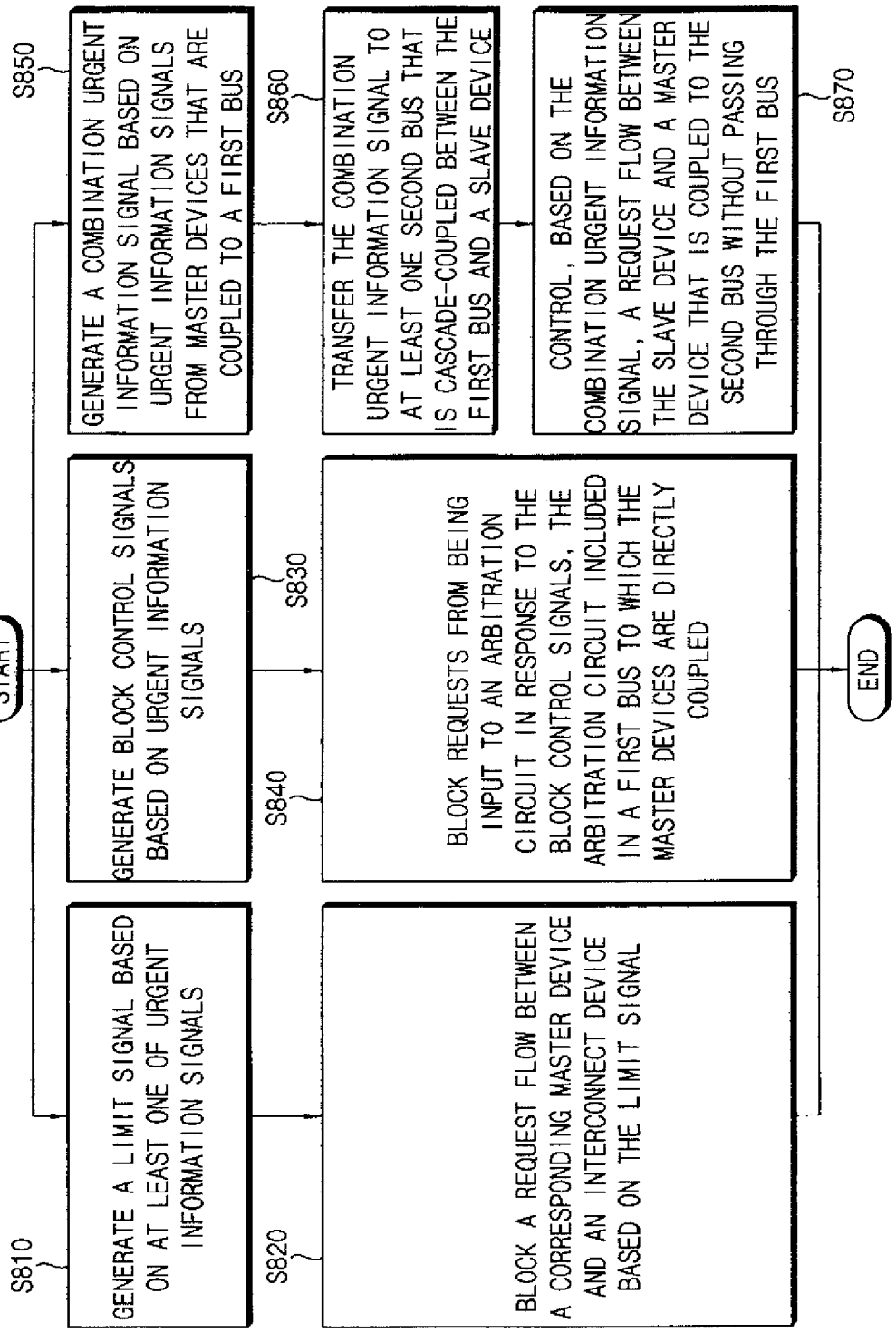
FIG. 29 is a flowchart illustrating a method of controlling request flows according to an exemplary embodiment of the inventive concept.

FIG. 29 is a flowchart illustrating a method of controlling request flows according to an exemplary embodiment of the inventive concept.

Referring to FIG. 29, the control of the request flows may be divided largely into three types.

Firstly, a limit signal may be generated based on at least one of urgent information signals (S810) and a request flow between a corresponding master device and an interconnect device may be blocked based on the limit signal (S820).

For example, using the generator 240 of FIG. 21, the limit signal LMT may be generated based on the urgent information signals UGNT2 and UGNT3 associated with the second and third master devices 102 and 103. The limit signal LMT may be provided to the limiter as illustrated in FIGS. 13A and 13B in the first service controller 501 associated with the first master device 101 so that the request flow between the first master device 101 and the interconnect device 10 may be controlled by the first service controller 501.

Secondly, block control signals may be generated based on urgent information signals (S830) and requests from may be blocked from being input to an arbitration circuit in response to the block control signals, where the arbitration circuit is included in a first bus to which the master devices are directly coupled (S840).

For example, using the generators 210, 220 and 230 of FIGS. 18, 19 and 20, the block control signals BKCTR1, BKCTR2 and BKCTR3 may be activated based on the conditions different from each other and the urgent information signals UGNT1, UGNT2 and UGNT3 associated with the master devices 101, 102 and 103 directly coupled to the first bus. As described with reference to FIGS. 15 and 27, the block control signals BKCTR1, BKCTR2 and BKCTR3 may be provided to the block circuit including the logic gates 21, 22 and 23 to block the requests from being input to the arbitration circuit 420.

Thirdly, a combination urgent information signal may be generated based on urgent information signals from master devices that are coupled to a first bus (S850) and the combination urgent information signal may be transferred to at least one second bus that is cascade-coupled between the first bus and a slave device (S860). A request flow between the slave device and a master device that is coupled to the second bus without passing through the first bus may be controlled based on the combination urgent information signal (S870).

For example, using the generator 250 of FIG. 22, the combination urgent information signal UGNTn may be generated based on the urgent information signals UGNT1, UGNT2 and UGNT3 associated with the master devices 101, 102 and 103 directly coupled to the first bus BUS1. Such combination urgent signal UGNTn may include the combination urgent signal UGNT21 transferred from the first bus BUS1 to the second bus BUS2 cascade-coupled to the first bus BUS1. The generator 240a of FIG. 24 included in the second bus BUS2 may generate the limit signal LMT2 based on the combination urgent information signal UGNT21. As illustrated in FIG. 23, the limit signal LMT2 may be provided to the limiter L in the fourth service controller 504 associated with the fourth master device 104 so that the request flow between the fourth master device 104 and the slave device 301 may be controlled by the fourth service controller 504, where the fourth master device 104 is coupled to the slave device 301 through the second bus BUS2 without passing through the first bus BUS1.

As such, the overall request flows may be controlled through the transfer of the urgent information between the layers of the buses, thereby further enhancing the quality of service (QOS) of the system.

Figure 30:
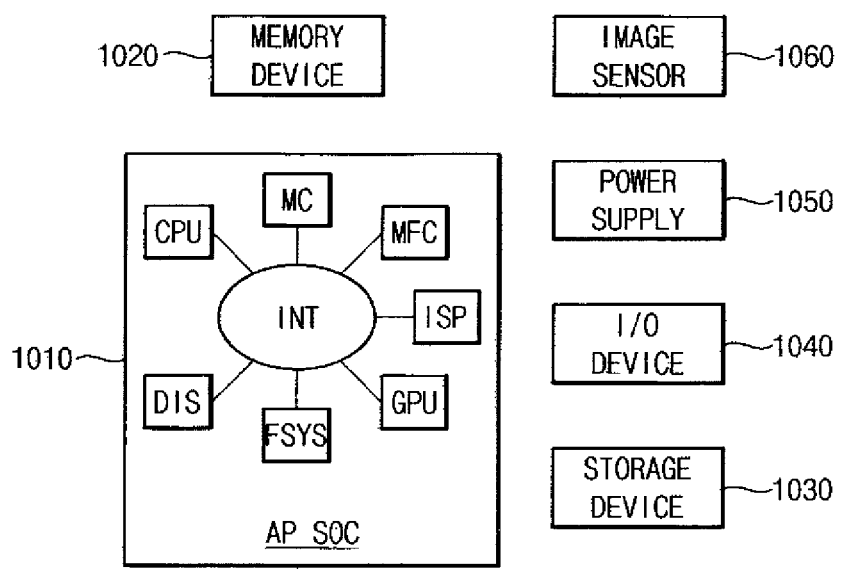
FIG. 30 is a block diagram illustrating a computing system including a system on chip according to an exemplary embodiment of the inventive concept.

FIG. 30 is a block diagram illustrating a computing system including a system on chip according to an exemplary embodiment of the inventive concept.

Referring to FIG. 30, a computing system 2000 includes a system on chip (SOC), a memory device 1020, a storage device 1030, an input/output (I/O) device 1040, a power supply 1050 and an image sensor 1060. Although it is not illustrated in FIG. 30, the computing system 2000 may further include ports that communicate with a video card, a sound card, a memory card, a USB device, or other electronic devices.

The SOC 1010 may be an application processor (AP) SOC including an interconnect device INT and a plurality of intellectual properties coupled to the interconnect device INT as described with reference to FIGS. 1 through 29. As illustrated in FIG. 30, the intellectual properties may include a memory controller MC, a central processing unit CPU, a display controller DIS, a file system block FSYS, a graphic processing unit GPU, an image signal processor ISP, a multi-format codec block MFC, etc. For example, the memory controller MC may correspond to the above-described slave device and other intellectual properties may correspond to the above-described master devices that use the memory controller MC as a common resource. Even though omitted in FIG. 30, the SOC 1010 may include the above-described service controllers to generate (e.g., in realtime) the urgent information signals and the priority information signals indicating service request levels of the respective master devices. At least one of the service controllers may include a limiter for controlling the request flow.

The SOC 1010 may communicate with the memory device 1020, the storage device 1030, the input/output device 1040 and the image sensor 1060 via a bus such as an address bus, a control bus, and/or a data bus. In at least one exemplary embodiment, the SOC 1010 is coupled to an extended bus, such as a peripheral component interconnection (PCI) bus.

The memory device 1020 may store data for operating the computing system 2000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 1030 may include a solid state drive (SSD), a hard disk drive (HDD), a CD-ROM, etc. The input/output device 1040 may include an input device (e.g., a keyboard, a keypad, a mouse, etc.) and an output device (e.g., a printer, a display device, etc.). The power supply 1050 supplies operation voltages for the computing system 2000.

The image sensor 1060 may communicate with the SOC 1010 via the buses or other communication links. As described above, the image sensor 1060 may be integrated with the SOC 1010 in one chip, or the image sensor 1060 and the SOC 1010 may be implemented as separate chips.

The components in the computing system 2000 may be packaged in various forms, such as package on package (PoP), ball grid arrays (BGAs), chip scale packages (CSPs), plastic leaded chip carrier (PLCC), plastic dual in-line package (PDT), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The computing system 2000 may be any computing system including at least one SOC. For example, the computing system 2000 may include a digital camera, a mobile phone, a smart phone, a portable multimedia player (PMP), a personal digital assistant (PDA), a tablet computer, etc.

FIG. 31 is a block diagram illustrating an interface employable in the computing system of FIG. 30 according to an exemplary embodiment of the inventive concept.

Referring to FIG. 31, a computing system 1100 may be implemented by a data processing device that uses or supports a mobile industry processor interface (MIPI) interface. The computing system 1100 may include an SOC 1110 in a form of an application processor (AP), an image sensor 1140, a display device 1150, etc. The SOC may include an interconnect device and service controllers as described above according to exemplary embodiments.

A CSI host 1112 of the SOC 1110 may perform a serial communication with a CSI device 1141 of the image sensor 1140 via a camera serial interface (CSI). In an exemplary embodiment, the CSI host 1112 may include a deserializer (DES), and the CSI device 1141 may include a serializer (SER). A DSI host 1111 of the SOC 1110 may perform a serial communication with a DSI device 1151 of the display device 1150 via a display serial interface (DST).

In an exemplary embodiment, the DSI host 1111 may include a serializer (SER), and the DSI device 1151 may include a deserializer (DES). The computing system 1100 may further include a radio frequency (RF) chip 1160 performing a communication with the SOC 1110. A physical layer (PHY) 1113 of the computing system 1100 and a physical layer (PHY) 1161 of the RF chip 1160 may perform data communications based on a MIPI DigRF. The SOC 1110 may further include a DigRF MASTER 1114 that controls the data communications of the physical layer PHY 1161.

The computing system 1100 may further include a global positioning system (GPS) 1120, storage 1170, a microphone MIC 1180, DRAM device 1185, and a speaker 1190. In addition, the computing system 1100 may perform communications using an ultra wideband (UWB) 1210, a wireless local area network (WLAN) 1220, a worldwide interoperability for microwave access (WIMAX) 1230, etc. However, the structure and the interface of the system 11000 is not limited thereto.

In a system and method according to at least one exemplary embodiment of the inventive concept, the urgent information and the priority information may be provided in realtime, using the service controllers, depending on the operational characteristics of the master devices. Based on the realtime information, the arbitration and the request flows may be controlled adaptively to enhance the QOS.

In the state of relatively light traffic, the competing requests may be arbitrated efficiently based on the priority information. In the state of relatively heavy traffic, the request flow from the master device of relatively lower priority may be limited based on the priority information to expedite the request flow from the master device of relatively higher priority.

In the systems of multi-layer interconnect structure, the overall request flows may be efficiently controlled through the inter-layer transfer of the priority information and the urgent information and thus the QOS of the system may be further enhanced.

A system and method of controlling a system according to at least one exemplary embodiment of the inventive may be efficiently used in connecting the master devices to the slave device that is commonly accessed by the master devices. At least one of the exemplary embodiments may be applied to a SOC in which various semiconductor components are integrated as one chip. According to at least exemplary embodiment of the inventive concept, request flows may be controlled efficiently in systems such a digital camera, a mobile phone, a PDA, APMT, a smart phone, etc. requiring a smaller size, a higher performance and a higher operational speed.

The foregoing is illustrative of exemplary embodiments and is not to be construed as limiting thereof. Although exemplary embodiments have been described, many modifications can be made in the exemplary embodiments without departing from the present inventive concept. Accordingly, all such modifications are intended to be included within the scope of the present inventive concept.

What is claimed is:
1. A system on chip (SOC) comprising:
at least one slave device:
a plurality of master devices configured to generate requests to demand services from the slave device, respectively;

a plurality of service controllers configured to generate urgent information signals and priority information signals for each of the respective master devices; and an interconnect device coupled to the slave device and the master devices through respective channels, the interconnect device configured to perform an arbitrating operation on the requests based on the priority information signals and configured to control request flows between the slave device and the master devices based on the urgent information signals, wherein the control of the request flows comprises blocking one of the request flows by masking at least one signal involved in a corresponding handshaking scheme, wherein the interconnect device includes a limit signal generator configured to generate a limit signal based on at least one of the urgent information signals, wherein at least one of the service controllers includes a limiter configured to block the one request flow between the corresponding master device and the interconnect device based on the limit signal, wherein the limiter comprises:
  a synchronizer configured to generate a synchronized limit signal based on the limit signal from the interconnect device; and
  a mask unit configured to block the one request flow between the corresponding master device and the interconnect device based on the synchronized limit signal.

2. The SOC of claim 1, wherein the limit signal generator is configured to generate the limit signal based on the urgent information signals that are generated by the service controllers except the service controller receiving the limit signal.

3. The SOC of claim 1, wherein the synchronizer is configured to sample the limit signal in response to falling edges of a global clock signal of the interconnect device to generate the synchronized limit signal.

4. The SOC of claim 1, wherein the mask unit comprises:
  a first logic gate configured to output a masked valid signal by performing a logic operation on the synchronized limit signal and a valid signal from the corresponding master device; and
  a second logic gate configured to output a masked ready signal by performing a logic operation on the synchronized limit signal and a ready signal from the interconnect device.

5. A method of controlling a system on chip (SOC) comprising at least one slave device, a plurality of master devices, a plurality of service controllers and an interconnect device, the slave device and the master devices coupled to the interconnect device through respective channels, the master devices generating requests to demand services from the slave device, respectively, the method comprising:
  detecting at least one of bandwidths and latencies of the master devices based on operational characteristics of the master devices;
  generating, urgent information signals and priority information signals based on at least one of the bandwidths and the latencies;
  performing an arbitrating operation on the requests based on the priority information signals; and
  controlling request flows between the slave device and the master devices based on the urgent information signals,
  wherein the controlling comprises blocking one of the request flows by masking at least one signal involved in a corresponding handshaking scheme, and wherein the controlling further comprises:
    generating, by the interconnect device, a limit signal based on at least one of the urgent information signals; and
    blocking, by a limiter of one of the service controllers, the one request flow between the corresponding master device and the interconnect device based on the limit signal,
    wherein the limiter comprises:
      a synchronizer configured to generate a synchronized limit signal based on the limit signal from the interconnect device; and
      a mask unit configured to block the one request flow between the corresponding master device and the interconnect device based on the synchronized limit signal.

6. The method of claim 5, wherein the requests are transferred according to the handshake scheme that uses a valid signal and a ready signal, and
  wherein controlling the request flows between the slave device and the master devices includes deactivating at least one of the valid signal and the ready signal based on the urgent information signals.

7. A system on chip (SOC) comprising:
at least one slave device:
a plurality of master devices configured to generate requests to demand services from the slave device, respectively;
a plurality of service controllers configured to generate urgent information signals and priority information signals for each of the respective master devices; and
an interconnect device coupled to the slave device and the master devices through respective channels, the interconnect device configured to perform an arbitrating operation on the requests based on the priority information signals and configured to control request flows between the slave device and the master devices based on the urgent information signals,
wherein the interconnect device includes a limit signal generator configured to generate a limit signal based on at least one of the urgent information signals,
wherein at least one of the service controllers includes a limiter configured to block the request flow between the corresponding master device and the interconnect device based on the limit signal, and
wherein the limiter comprises a synchronizer configured to generate a synchronized limit signal based on the limit signal from the interconnect device and a mask unit configured to block the request flow between the corresponding master device and the interconnect device based on the synchronized limit signal.

* * * * *